United States Patent
Hosseini et al.

(10) Patent No.: US 12,395,982 B2
(45) Date of Patent: Aug. 19, 2025

(54) UPLINK SKIPPING AND UPLINK CONTROL INFORMATION MULTIPLEXING FOR WIRELESS COMMUNICATION

(71) Applicant: QUALCOMM Incorporated, San Diego, CA (US)

(72) Inventors: Seyedkianoush Hosseini, San Diego, CA (US); Yi Huang, San Diego, CA (US); Peter Gaal, San Diego, CA (US); Linhai He, San Diego, CA (US); Rajat Prakash, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 17/648,109

(22) Filed: Jan. 14, 2022

(65) Prior Publication Data

US 2022/0232591 A1    Jul. 21, 2022

Related U.S. Application Data

(60) Provisional application No. 63/140,722, filed on Jan. 22, 2021, provisional application No. 63/138,666, filed on Jan. 18, 2021.

(51) Int. Cl.
*H04W 72/02* (2009.01)
*H04W 72/0453* (2023.01)
(Continued)

(52) U.S. Cl.
CPC ....... *H04W 72/1268* (2013.01); *H04W 72/02* (2013.01); *H04W 72/0453* (2013.01);
(Continued)

(58) Field of Classification Search
CPC ............ H04L 5/0001–0098; H04W 8/18–245; H04W 28/02–26; H04W 48/02–20;
(Continued)

(56) References Cited

U.S. PATENT DOCUMENTS 11,516,819 B2 *  11/2022  Huang ................... H04W 72/56
11,825,511 B2 *  11/2023  Hosseini ............. H04W 72/569
(Continued)

FOREIGN PATENT DOCUMENTS

WO    WO-2020146247 A2 *  7/2020  .......... H04W 72/042

OTHER PUBLICATIONS

CATT: "Intra-UE Multiplexing and Prioritization", 3GPP Draft, 3GPP TSG RAN WG1 #103-e, R1-2007852, 3GPP, vol. RAN WG1, No. e-Meeting, Oct. 26, 2020-Nov. 13, 2020, Oct. 24, 2020, XP051946531, 6 Pages, Retrieved from the Internet: URL: https://ftp.3gpp.org/tsg_ran/WG1_RL1/TSGR1_103-e/Docs/R1-2007852.zip. R1-2007852_Intra-UE Multiplexing and Prioritization_Final.docx [Retrieved on Oct. 24, 2020] Sections 2.1 through 2.3.
(Continued)

*Primary Examiner* — Timothy J Weidner
(74) *Attorney, Agent, or Firm* — QUALCOMM Incorporated

(57) ABSTRACT

A UE initiates a PUSCH transmission determination procedure if at least one of a first PUSCH overlaps with a second PUSCH in a transmission and a first PUCCH overlaps with the first PUSCH or the second PUSCH, or if the first PUCCH overlaps with at least one of the first PUSCH or the second PUSCH in the transmission and the first PUSCH and the second PUSCH are not overlapped with each other, the first PUSCH and the second PUSCH being associated with different uplink priorities. The UE multiplexes the first PUCCH with the first PUSCH or the second PUSCH that overlaps with the first PUCCH. The UE transmits the first
(Continued)

PUSCH or the second PUSCH based on at least one of the uplink priorities associated with the first PUSCH and the second PUSCH or uplink priorities associated with the first PUCCH and a second PUCCH.

30 Claims, 17 Drawing Sheets

(51) Int. Cl.
    *H04W 72/1268*    (2023.01)
    *H04W 72/21*    (2023.01)
    *H04W 72/23*    (2023.01)
    *H04W 72/566*    (2023.01)
    *H04W 80/02*    (2009.01)
    *H04W 84/02*    (2009.01)
    *H04W 88/02*    (2009.01)
    *H04W 88/08*    (2009.01)
    *H04W 92/02*    (2009.01)
    *H04W 92/10*    (2009.01)

(52) U.S. Cl.
    CPC ........... *H04W 72/21* (2023.01); *H04W 72/23* (2023.01); *H04W 72/569* (2023.01); *H04W 80/02* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
    CPC ........... H04W 72/02–569; H04W 74/002–008; H04W 76/10–50; H04W 80/02; H04W 84/02–16; H04W 88/02–12; H04W 92/02–04; H04W 92/10
    See application file for complete search history.

(56) References Cited

U.S. PATENT DOCUMENTS

| | | | |
|---|---|---|---|
| 2020/0314900 A1* | 10/2020 | Hosseini | H04W 72/56 |
| 2022/0232590 A1* | 7/2022 | Huang | H04W 72/1268 |
| 2023/0138449 A1* | 5/2023 | Khoshnevisan | H04W 72/21 |
| 2023/0337240 A1* | 10/2023 | Zhang | H04W 72/1268 |
| 2023/0413272 A1* | 12/2023 | Fu | H04W 72/1268 |
| 2023/0422242 A1* | 12/2023 | Guo | H04W 72/56 |
| 2024/0306154 A1* | 9/2024 | Wang | H04W 72/569 |

OTHER PUBLICATIONS

International Search Report and Written Opinion—PCT/US2022/012804—ISA/EPO—May 11, 2022.

* cited by examiner

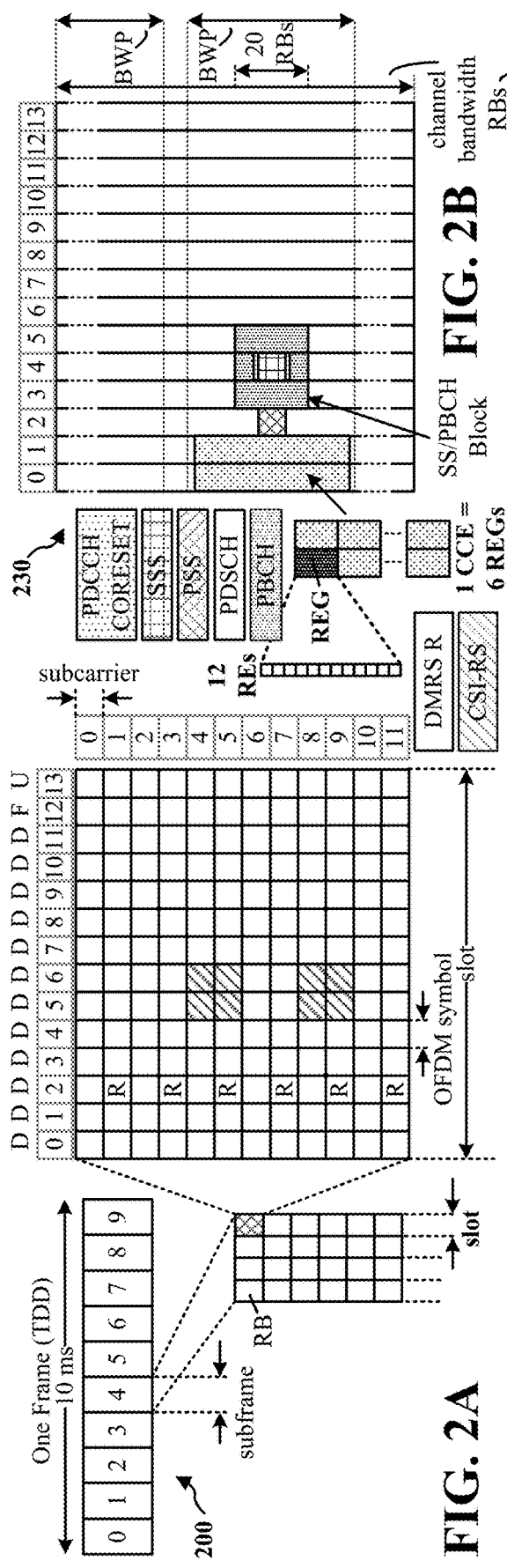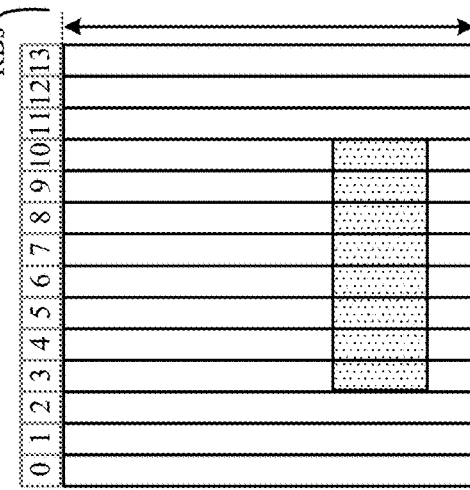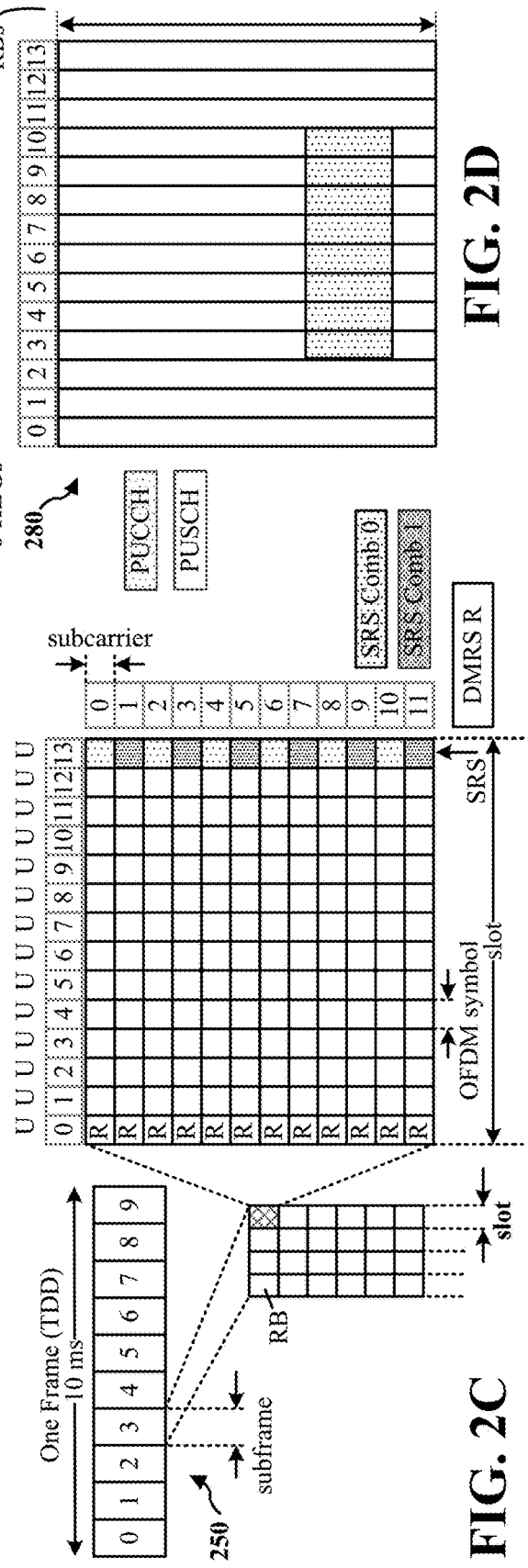
FIG. 2A   FIG. 2B   FIG. 2C   FIG. 2D

UPLINK SKIPPING AND UPLINK CONTROL INFORMATION MULTIPLEXING FOR WIRELESS COMMUNICATION

CROSS REFERENCE TO RELATED APPLICATION(S)

This application claims the benefit of and priority to U.S. Provisional Application Ser. No. 63/138,666, entitled "UPLINK SKIPPING AND UPLINK CONTROL INFORMATION MULTIPLEXING FOR WIRELESS COMMUNICATION" and filed on Jan. 18, 2021, and U.S. Provisional Application Ser. No. 63/140,722, entitled "UPLINK SKIPPING AND UPLINK CONTROL INFORMATION MULTIPLEXING FOR WIRELESS COMMUNICATION" and filed on Jan. 22, 2021, which are expressly incorporated by reference herein in their entirety.

TECHNICAL FIELD

The present disclosure relates generally to communication systems, and more particularly, to wireless communication involving uplink (UL) skipping and uplink control information (UCI) multiplexing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a user equipment (UE). The apparatus initiates a physical uplink shared channel (PUSCH) transmission determination procedure when at least one of a first PUSCH overlaps with a second PUSCH in a transmission and a first physical uplink control channel (PUCCH) overlaps with the first PUSCH or the second PUSCH, the first PUSCH and the second PUSCH being associated with different uplink priorities. The apparatus multiplexes the first PUCCH with the first PUSCH or the second PUSCH that overlaps with the first PUCCH. The apparatus transmits the first PUSCH or the second PUSCH based on at least one of the uplink priorities associated with the first PUSCH and the second PUSCH or uplink priorities associated with the first PUCCH and a second PUCCH.

In an aspect of the disclosure, a method, a computer-readable medium, and an apparatus are provided for wireless communication of a UE. The apparatus initiates a carrier component (CC) selection procedure when at least one of multiple CCs is carrying a dynamic-grant PUSCH (DG-PUSCH) and a configured-grant PUSCH (CG-PUSCH) that are overlapping with each other. The apparatus maintain, for each CC in the multiple CCs that is carrying the overlapping DG-PUSCH and the overlapping CG-PUSCH, the CC as a candidate CC in a set of candidate CCs for UCI multiplexing, excluding the CC as the candidate CC from the set of candidate CCs for UCI multiplexing, or assuming one of the DG-PUSCH or the CG-PUSCH is selected in the CC and determining whether the CC qualifies as the candidate CC to be included in the set of candidate CCs for UCI multiplexing. The apparatus selects a CC from the set of candidate CCs based on a UCI multiplexing rule if there is more than one candidate CC. The apparatus informs a MAC layer of the UE that a PUSCH on the selected CC is not to be skipped for transmission.

In an aspect of the disclosure, a method, a computer-readable medium, and an apparatus are provided for wireless communication of a UE. The apparatus initiates a PUSCH transmission determination procedure when at least one of a first PUSCH overlaps with a second PUSCH in a transmission and a first PUCCH overlaps with the first PUSCH or the second PUSCH, the first PUSCH and the second PUSCH being associated with different uplink priorities. The apparatus multiplexes the first PUCCH with the first PUSCH or the second PUSCH that overlaps with the first PUCCH. The apparatus determines whether to transmit the first PUSCH or the second PUSCH based on at least one of the uplink priorities associated with the first PUSCH and the second PUSCH or uplink priorities associated with the first PUCCH and a second PUCCH. The apparatus transmits the first PUSCH or the second PUSCH based on the determination.

In an aspect of the disclosure, a method, a computer-readable medium, and an apparatus are provided for wireless communication of a base station. The apparatus transmits, to a UE, an indication of which PUSCH is to be selected by the UE when the UE is scheduled with at least two PUSCHs with different uplink priorities that are at least partially overlapped and at least one of the at least two PUSCHs is multiplexed with a PUCCH. The apparatus receives, from the UE, one of the at least two PUSCHs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
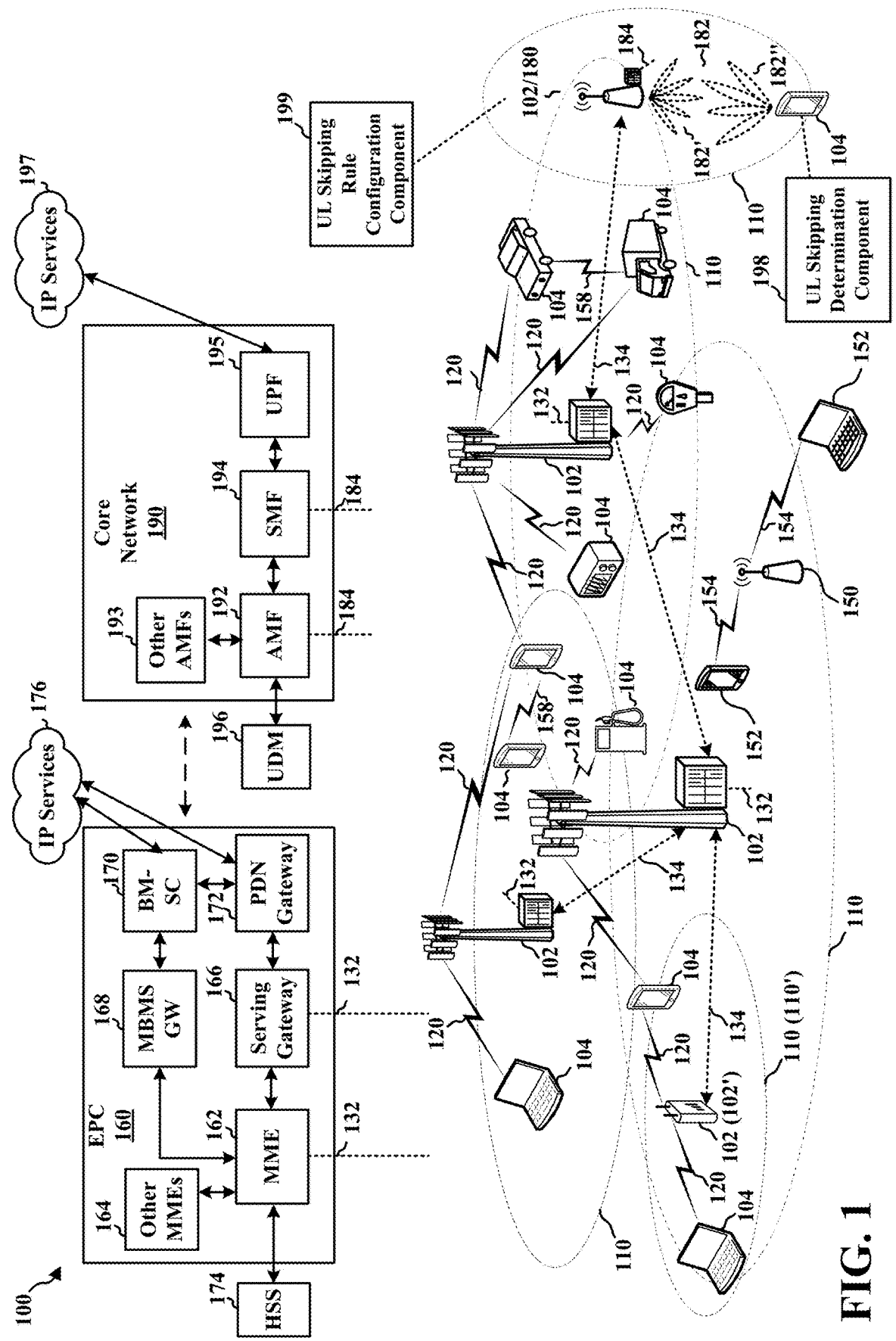
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include an UL skipping determination component 198 configured to determine whether to apply uplink skipping for overlapping transmissions involving UCI multiplexing based at least in part on uplink priorities associated with the overlapping transmissions. In one configuration, the UL skipping determination component 198 may be configured to initiate a PUSCH transmission determination procedure if at least one of a first PUSCH overlaps with a second PUSCH in a transmission and a first PUCCH overlaps with the first PUSCH or the second PUSCH, or if the first PUCCH overlaps with at least one of the first PUSCH or the second PUSCH in the transmission and the first PUSCH and the second PUSCH are not overlapped with each other, the first PUSCH and the second PUSCH being associated with different uplink priorities. In such configuration, the UL skipping determination component 198 may multiplex the first PUCCH with the first PUSCH or the second PUSCH that overlaps with the first PUCCH. In such configuration, the UL skipping determination component 198 may determine whether to transmit the first PUSCH or the second PUSCH based on at least one of the uplink priorities associated with the first PUSCH and the second PUSCH or uplink priorities associated with the first PUCCH and a second PUCCH. In such configuration, the UL skipping determination component 198 may transmit the first PUSCH or the second PUSCH based on the determination.

In certain aspects, the base station 102/180 may include an UL skipping rule configuration component 199 configured to transmit indication and/or rule to a UE for determining when the UE may skip one or more overlapping uplink transmissions. In one configuration, the UL skipping rule configuration component 199 may be configured to transmit, to a UE, an indication of which PUSCH is to be selected by the UE when the UE is scheduled with at least two PUSCHs with different uplink priorities that are at least partially overlapped and at least one of the at least two PUSCHs is multiplexed with a PUCCH. In such configuration, the UL skipping rule configuration component 199 may receive, from the UE, one of the at least two PUSCHs.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
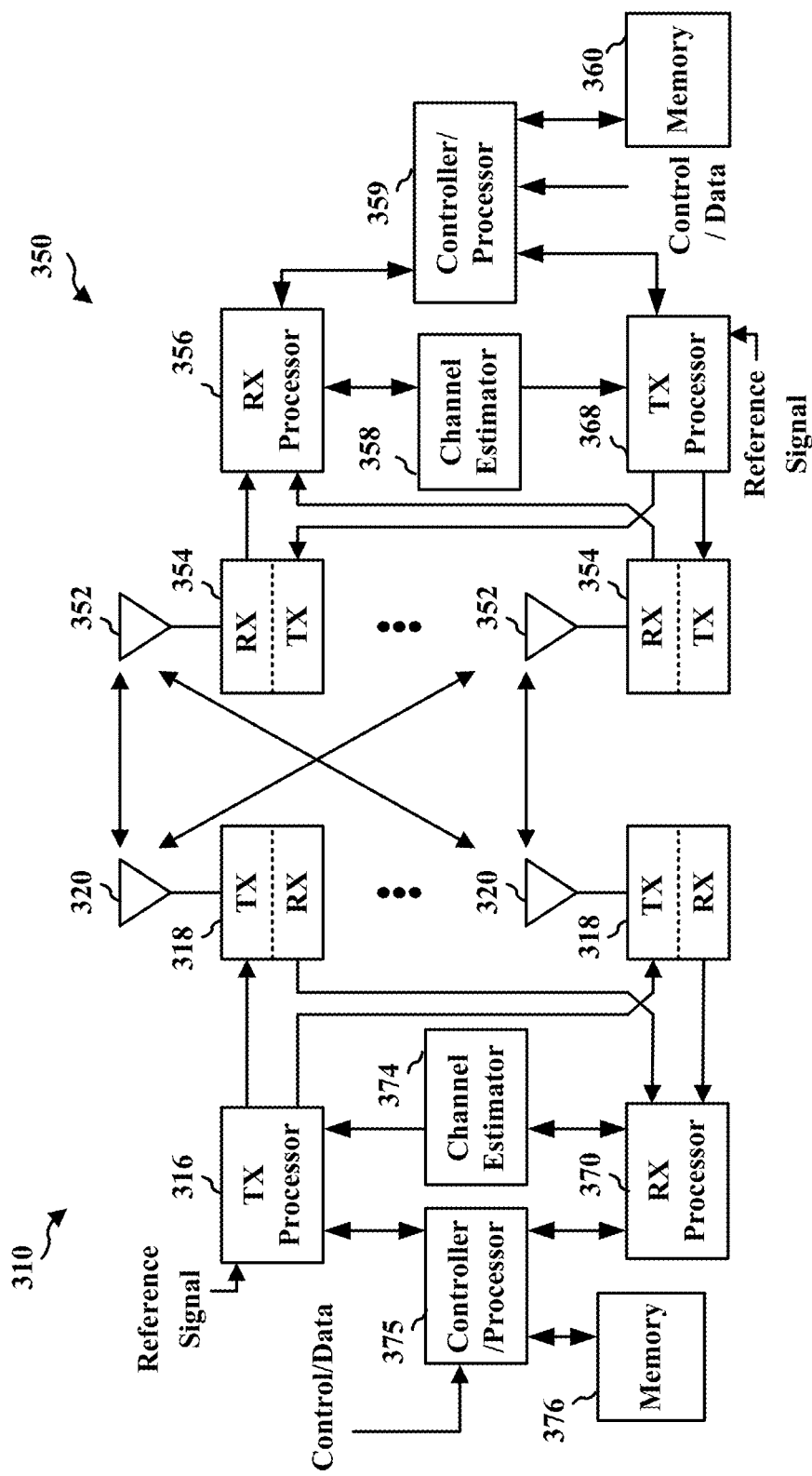
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UL skipping determination component 198 of FIG. 1.

At least one of the TX processor 316, the RX processor 370, and the controller/processor 375 may be configured to perform aspects in connection with the UL skipping rule configuration component 199 of FIG. 1.

In some aspects of wireless communications, a UE may determine to skip an uplink (UL) transmission for an UL grant indicated on a physical downlink control channel (PDCCH) if the UE does not have data for transmission, such as when the UE has finished a data transmission in a prior UL grant or the data transmission is cancelled at the UE. For example, a UE may be configured (e.g., by a base station) with a physical uplink shared channel (PUSCH) based on a dynamic grant (DG) (e.g., a DG-PUSCH) and/or based on a configured grant (CG) (e.g., a CG-PUSCH), etc. In some examples, a DG-PUSCH may be a PUSCH that is scheduled by downlink control information (DCI) and a CG-PUSCH may be a PUSCH that is configured by radio resource control (RRC) signaling. However, after receiving an UL grant for a PUSCH, if the UE does not have any data for transmission, such as when there is no data from logical channels (LCHs) of the UE that may be mapped to the PUSCH, the UE may skip the uplink transmission. For example, the media access control (MAC) layer of the UE may not generate protocol data units (PDUs) for a PUSCH when no data is mapped from LCHs of the UE to the PUSCH. Hence, the physical (PHY) layer of the UE may determine not to transmit the PUSCH. In some examples, a UE may be specified or configured to initiate uplink skipping for a CG-PUSCH when the UE does not have data to transmit. In other examples, a UE may be able to determine whether to skip an uplink transmission for DG-PUSCH when the UE does not have data to transmit, where the determination may be based on the UE's capability. For example, if the UE does not have the capability to skip the DG-PUSCH, the MAC layer of the UE may still generate a PDU (e.g., a zero PDU) for the DG-PUSCH for the uplink transmission. In other words, the UE may be configured to transmit an empty uplink transmission.

In some examples, a UE (or the MAC layer of the UE) may be configured to not skip a PUSCH transmission if the PUSCH transmission is multiplexed with a physical uplink control channel (PUCCH) that carries uplink control information (UCI). Such configuration may assist a base station to identify whether a PUSCH is multiplexed with a PUCCH. For example, if the UE skips a PUSCH that is multiplexed with a PUCCH/UCI, the serving base station may not be able to identify which PUSCH from the UE is multiplexed with UCI. As an illustration, a UE may be configured with two (2) UL component carriers (CCs), such as a first CC (e.g., CC0) and a second CC (e.g., CC1). In a given slot, there may be a first PUSCH on the first CC and a second PUSCH on the second CC, and there may also be a PUCCH (e.g., UCI) on the first CC that overlaps with both PUSCHs. As a base station may not know whether a UE skips any PUSCHs or which PUSCH the UE skips if one the PUSCHs is skipped by the UE, the base station may be configured to perform blind decoding on both component carriers (e.g., CC0 and CC1) to determine where UCI is multiplexed on any of the PUSCHs. As such, by configuring a UE not to skip a PUSCH that carries a PUCCH/UCI, the base station may be more likely to locate a PUSCH that carries the UCI, which may make the UCI multiplexing procedure and/or UL skipping performed by the UE more deterministic to the base station. In other examples, for UL skipping of dynamic UL grant (e.g., DG-PUSCH) or configured UL grant (e.g., CG-PUSCH) in non-carrier aggregation (CA) and CA cases, when a PUCCH carrying UCI overlaps with a set of PUSCHs, a UE may not skip the PUSCH with UCI multiplexing from the set of PUSCHs. For example, the MAC layer of the UE may be configured to generate a MAC PDU for that PUSCH, and then the UCI may be multiplexed on that PUSCH. This UL skipping rule may be applicable to UEs that are not configured with, or not capable of supporting, different uplink transmission priorities (e.g., L1 priorities).

A UE may be configured to determine which a PUSCH may be transmitted and which PUSCH(s) may be skipped when there is a collision in the uplink transmission, such as when two or more PUSCHs are at least partially overlapped with one another in time. In one example, for a UE that is capable of or supports different uplink transmission priorities, a base station may assign priorities for different UL channels/transmissions granted to the UE, and the base station may also indicate the priorities associated with the UL channels/transmissions to the UE, such as via a DCI message or via RRC signaling. For example, the base station may indicate the priority associated with a DG-PUSCH, or a PUCCH in response to a DG-PDSCH, to a UE using DCI, and the base station may indicate the priority associated with a scheduled request (SR) or a CG-PUSCH to the UE semi-statically via RRC signaling (e.g., the priorities may be given to the UE as part of their configuration). Based at least in part on the indicated priorities that are associated with one or more uplink channels, if there is a collision in the uplink across channels/transmissions of different priorities, the UE may drop or skip channel(s)/transmission(s) with a lower priority, such as by terminating the transmission. For example, if a PUSCH with low priority collides (e.g., overlaps) with a PUCCH with high priority, the UE may drop the PUSCH with low priority.

In some examples, such as for ultra-reliable low latency communications (URLLC), a UE may be able to multiplex at least one PUCCH with another PUCCH that has a different priority, or multiplex at least one PUCCH with a PUSCH that has a different priority. For example, a PUCCH assigned with a high uplink priority may be multiplexed with a PUCCH assigned with a low uplink priority or multiplexed with a PUSCH assigned with a low uplink priority, etc. In other words, URLLC may allow for multiplexing of PUCCH and PUCCH or PUCCH and PUSCH even if they have a different L1 priority. For purpose of the present disclosure, the term "L1 priority/priorities" may be used interchangeably with the term "uplink priority/priorities," which may be referred to the priorities that may be given to a UE at the PHY layer of the UE via DCI and/or an RRC signaling.

Aspects presented herein may improve UL skipping procedures involving multiplexing schemes. Aspects presented herein may enable a UE's behavior related to UL skipping and/or UCI multiplexing to be more deterministic to a base station, such that the base station may determine or understand what decisions are made by a UE regarding UL skipping, e.g., which PUSCH(s) and/or PUCCH(s) are skipped by the UE and/or which PUSCH(s) are multiplexed with UCI, etc. Aspects presented herein may also enable a UE to determine which PUSCH(s) and/or PUCCH(s) may be skipped when a collision (e.g., an overlap) occurs between multiple uplink channels with different uplink (e.g., L1) priorities and/or UCI multiplexing in a more efficient manner, such that high priority transmissions may be protected to the extent possible.

In some scenarios, a UE may be configured with multiple PUSCHs but the UE may be able to transmit just one of the PUSCHs. For example, the UE may be configured with at least two PUSCHs on the same carrier that are overlapped with each other (e.g., a DG-PUSCH overlapping with a CG-PUSCH), and at least one of the at least two overlapped PUSCHs may be multiplexed with at least one PUCCH carrying UCI. In another example, the UE may be configured with at least two PUSCHs on different carriers that are not overlapped with each other, but there may be a PUCCH that overlaps with the at least two PUSCHs.

In one aspect of the present disclosure, if the UE is capable of transmitting just one of the multiple PUSCHs configured, the UE may determine/select a PUSCH that may not be skipped/dropped by the UE (e.g., from the at least two overlapped PUSCHs) based at least in part on the uplink priority associated with the PUSCH/PUCCH and whether the PUSCH is multiplexed with PUCCH. Aspects presented herein may apply to a UE that does not support or is configured not to perform UCI multiplexing across UL channels with different priorities, e.g., the UE may not multiplex a PUCCH with a PUCCH/PUSCH having a different uplink priority. The multiplexing of UCI (e.g., PUCCH) with UL channels (e.g., PUSCH and/or PUCCH) with different priorities may be referred to as "cross-priority multiplexing." For example, a UE may be configured with different L1 priorities, such as one or more PUSCHs with different uplink priorities. However, regardless the uplink priorities associated with the one or more PUSCHs, the PUSCH with UCI multiplexed on it may be selected by the PHY layer of the UE as the one that may not be skipped by the MAC layer of the UE. If there are multiple PUSCHs multiplexed with UCI, then the PHY layer of the UE may select the PUSCH with a higher/highest priority.

Figure 4:
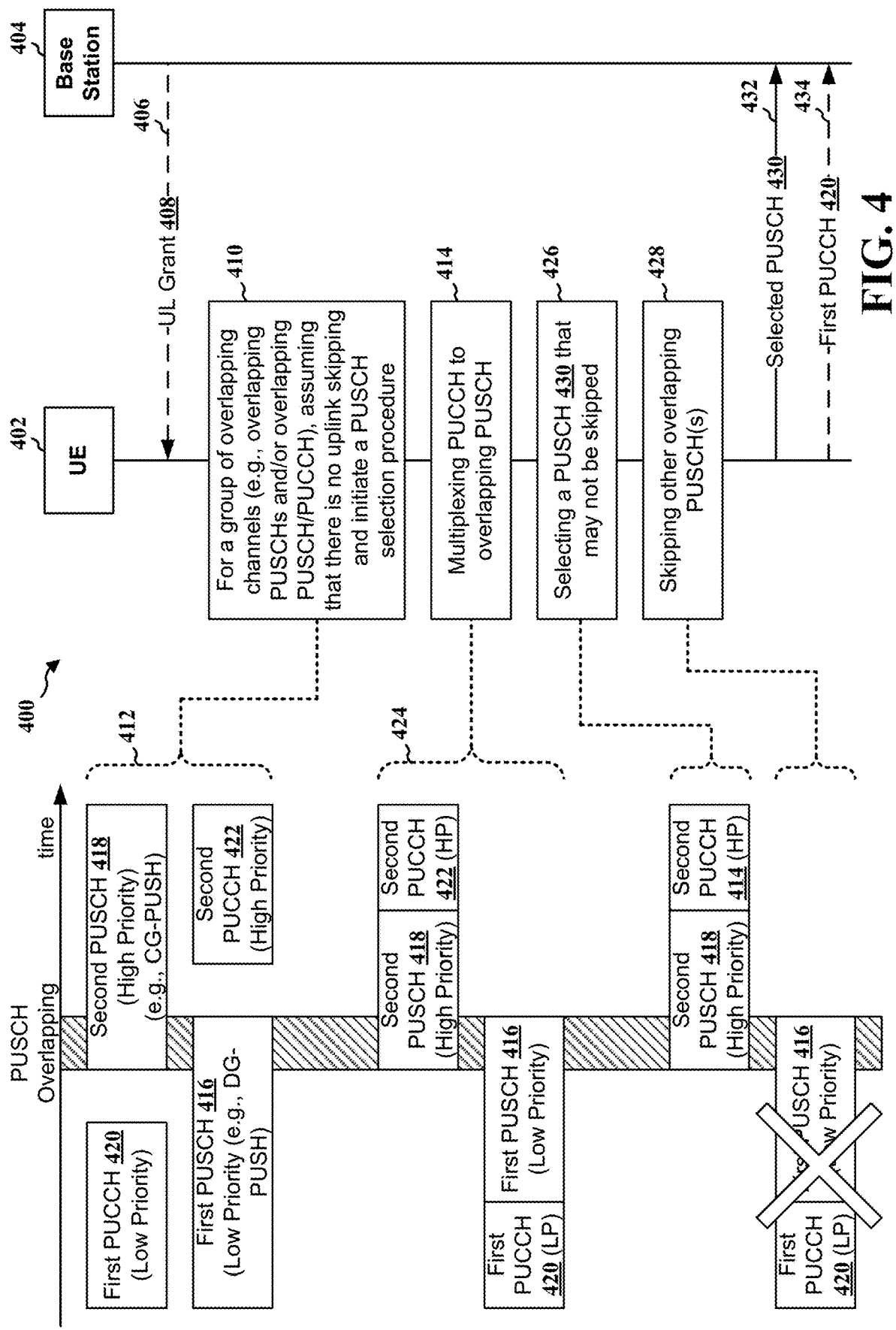
FIG. 4 is a communication flow illustrating an example of a UL skipping determination procedure according to aspects of the present disclosure.

FIG. 4 is a communication flow 400 illustrating an example of an UL skipping determination procedure according to aspects of the present disclosure. Aspects presented herein may be applicable to communications involving carrier aggregation (CA), such as communications involving uplink CA (UL CA).

At 406, a base station 404 may configure one or more UL grants 408 scheduling one or more uplink channels (e.g., PUCCHs and/or PUSCHs) for a UE 402, which may include a CG-PUSCH, a DG-PUSCH, etc. The base station 404 may assign each of the one or more uplink channels with an uplink priority (e.g., an L1 priority), and the base station may indicate the priorities associated with the one or more uplink channels to the UE 402 using DCI, via RRC signaling, or both. For examples, the base station 404 may indicate the priorities to the UE using DCI for a DG-PUSCH or for a PUCCH in response to a DG-PDSCH, or via RRC signaling for a SR or a CG-PUSCH, etc. For purposes of the present disclosure, the term "overlapping channels" or "overlapping uplink channels" may refer to at least two uplink channels overlapping with each other. For example, overlapping channels may include, and is not limited to, two PUSCHs on the same carrier that are overlapped with each other (e.g., a DG-PUSCH overlapping with a CG-PUSCH), and/or a PUSCH overlaps with a PUCCH, etc.

At 410, the UE 402 may identify whether there are overlapping uplink channels, such as a PUSCH overlapping with another PUSCH or a PUCCH overlapping with another PUSCH/PUCCH, etc. If the UE 402 identifies there are overlapping uplink channels, such as at least two PUSCHs are at least partially overlapped with each other (hereafter "overlapped PUSCHs") and at least one PUCCH overlaps with at least one of the overlapped PUSCHs, or a PUCCH overlaps with at least two PUSCHs but the at least two PUSCHs are not overlapped with each other (hereafter "overlapped PUCCH/PUSCH"), the UE 402 may be configured to first assume there is no uplink skipping for the overlapping uplink channels (e.g., no uplink skipping for the overlapped PUSCHs or the overlapped PUSCH/PUCCH), and the UE may initiate a PUSCH selection/skipping procedure to determine which PUSCH(s) may be skipped or may not be skipped (hereafter may be collectively referred to as a "PUSCH transmission determination procedure" or a "PUSCH skipping determination procedure"). For example, the PHY layer of the UE 402 may be configured to assume that all overlapped PUSCHs or overlapped PUCCH/PUSCH are to be used by the UE for uplink transmissions. In other words, for a group of overlapping PUSCHs and/or PUCCHs that overlap with each other, the UE 402 may be configured to first assume that there is no uplink skipping.

For example, as shown at 412, the UE 402 may identify that a first PUSCH 416 configured with a low uplink priority (e.g., a low priority (LP) DG-PUSCH) may overlap with a second PUSCH 418 configured with a high uplink priority (e.g., a high priority (HP) CG-PUSCH), that a first PUCCH 420 configured with a low priority may overlap with the first PUSCH 416, and that a second PUCCH 422 configured with a high priority may overlap with the second PUSCH 418, etc. In another example the UE 402 may identify that a PUCCH may overlap with two PUSCHs (not shown in the figure), where the two PUSCHs may not overlap with each other and/or the two PUSCHs may be on different carriers. Thus, the UE 402 may assume there is no uplink skipping for the overlapped channels, such as for the overlapped first PUSCH 416 and the second PUSCH 418.

At 414, for one or more PUCCHs that overlap with PUSCH(s), such as PUCCHs that overlap with any of the overlapped PUSCHs, the UE 402 may multiplex each PUCCH with the corresponding PUSCH in which the PUCCH overlaps. For example, as shown at 424, as the first PUCCH 420 overlaps with the first PUSCH 416, the UE 402 may multiplex the first PUCCH 420 with the first PUSCH 416. Similarly, as the second PUCCH 422 overlaps with the second PUSCH 418, the UE may multiplex the second PUCCH 422 with the second PUSCH 418. In some examples, if the UE 402 does not have the capability, permission, or configuration to multiplex channels of different priorities, the UE 402 may drop a channel that is with a lower priority. For example, if the first PUCCH 420 is configured with a lower priority and the first PUSCH 416 is configured with a high priority and they overlap with each other, the UE 402 may drop the first PUCCH 420 (e.g., the channel with a lower priority).

At 426, the UE 402 may determine/select a PUSCH 430 from the overlapped PUSCHs or the overlapped PUSCH/PUCCH that may not be skipped by the UE 402 (or skipped by the MAC layer of the UE 402). As the UE 402 may be configured with different uplink (e.g., L1) priorities, the selection of the PUSCH 430 may be independent of whether a UCI is multiplexed on a PUSCH or not. As such, both the UCI multiplexing and the priority of the channels may be considered by the UE 402 when the UE 402 is determining which PUSCH to be selected as non-skippable. For example, the UE 402 may be configured to make the determination/selection based on the uplink priority associated with each PUSCH and/or whether each PUSCH/PUCCH is multiplexed with PUCCH/UCI, etc.

In one example, if the UE 402 identifies that multiple PUSCHs may carry UCI (e.g., multiple PUSCHs are multiplexed with PUCCH), the UE 402 may select the PUSCH 430 based on the uplink/L1 priority associated with the PUSCH 430 or the uplink/L1 priority associated with the PUCCH that is multiplexed on the PUSCH 430. For example, referring to FIG. 4, at 426, after the UE 402 determines that both the first PUSCH 416 and the second PUSCH 418 may be multiplexed with the first PUCCH 420 and the second PUCCH 422, respectively, and that the UE 402 may not transmit both PUSCHs 416 and 418 together (e.g., such as when DG-PUSCH and CG-PUSCH are overlapping on a same carrier), the UE 402 may select the second PUSCH 416 as the PUSCH (e.g., the PUSCH 430) that may not be skipped by the UE 402. In some examples, the selection may be based on the second PUSCH 418 being configured with a high priority (e.g., higher priority than the PUSCH 416). In other words, if there are multiple PUSCHs that are overlapped with at least one another and each PUSCH is multiplexed with a PUCCH/UCI, a UE may select a PUSCH among the multiple PUSCHs based on the uplink (e.g., L1) priorities associated with the multiple PUSCHs (e.g., the PUSCH with highest uplink priority is selected). Note that while the example shows the first PUSCH 416 and the second PUSCH 418 are overlapped at least partially with each other, it is merely for illustration. In some examples, the first PUSCH 416 and the second PUSCH 418 may not be overlapped with each other, and may be overlapped with another PUCCH. Similarly, the UE 402 may select a PUSCH following the same rule (based on the uplink/L1 priority associated with the PUSCH or the uplink/L1 priority associated with the PUCCH that is multiplexed on the PUSCH).

In other examples, as described in more details below in connection with FIG. 6, if a UE has the capability to support cross-priority multiplexing, the selection may be based on the uplink priority associated with the PUCCH. For example, if the second PUSCH 418 is multiplexed with a PUCCH (e.g., the PUCCH 422) that has a higher priority than the PUCCH (e.g., the PUCCH 420) multiplexed on other PUSCH(s) (e.g., the PUSCH 416), the UE 402 may select the second PUSCH 418 to be non-skippable (i.e., the transmission of the second PUSCH 418 may not be skipped). In other words, if a UE supports cross-priority multiplexing and there are multiple PUSCHs that are overlapped with at least one another and each PUSCH is multiplexed with a PUCCH/UCI, a UE may select a PUSCH among the multiple PUSCHs based on the uplink (e.g., L1) priorities associated with the PUCCHs that are multiplexed on the multiple PUSCHs (e.g., the PUSCH multiplexed with the highest uplink priority of a PUCCH may be selected).

In another example, if a UE has the capability to support cross-priority multiplexing, the selection may be based on the content of the PUCCH. For example, if the second PUSCH 418 is multiplexed with a PUCCH (e.g., the PUCCH 422) that includes specified UCI contents, such as HARQ feedback (ACK/NACK) bits, channel state information (CSI) bits, etc., the UE 402 may select the second PUSCH 418 to be non-skippable (i.e., the transmission of the second PUSCH 418 may not be skipped). In other words, if a UE supports cross-priority multiplexing and there are multiple PUSCHs/PUCCHs that are overlapped with at least one another and each PUSCH is multiplexed with a PUCCH/UCI, a UE may select a PUSCH among the multiple PUSCHs based on the contents associated with the PUCCHs that are multiplexed on the multiple PUSCHs (e.g., the PUSCH multiplexed with a PUCCH that has the specified content may be selected).

At 428, after the UE 402 selects the PUSCH 430 that may not be skipped, the UE 402 may skip/drop other overlapped PUSCHs, e.g., PUSCH(s) that overlap(s) with the PUSCH 430. For example, after the UE 402 selects the second PUSCH 418 to be the PUSCH 430 that may not be skipped, the UE 402 may skip/drop the first PUSCH 416 as it overlaps with the PUSCH 418. The PHY layer of the UE 402 may indicate to the MAC layer of the UE 402 that the PUSCH 430 is selected not to be skipped, such that the MAC layer of the UE 402 may skip other PUSCHs except the PUSCH 430. For example, the MAC layer of the UE 402 may generate PDUs for the PUSCH 430, and the MAC layer of the UE 402 may not generate PDUs for the skipped PUSCH(s).

At 432, the UE 402 may transmit the selected PUSCH 430 to the base station 404. In one example, after the UE 402 determines one or more PUSCH(s) that are to be skipped by the UE 402 (e.g., after the PHY layer of the UE 402 identifies a PUSCH to be skipped the by MAC layer of the UE 402), the UE 402 may drop the PUCCH(s) that is multiplexed on the skipped PUSCH(s). For example, after the UE 402 determines to skip/drop the first PUSCH 416, the UE 402 may also be configured to skip/drop the first PUCCH 420 that is multiplexed on the first PUSCH 416. In another example, if a PUCCH that is multiplexed on a skipped/dropped PUSCH does not overlap with any other transmissions with higher uplink priorities (e.g., another PUCCH with a higher uplink priority), the UE 402 may be configured to transmit the PUCCH. For example, at 434, if the UE 402 skips/drops the first PUSCH 416 that is multiplexed with the first PUCCH 420, the UE 402 may be configured to transmit the first PUCCH 420 to the base station 404 if the first PUCCH 420 does not overlap with another transmission (e.g., PUCCH) with a higher priority.

For a UE that is configured not to skip a PUSCH multiplexed with UCI but does not take uplink priority into consideration, the MAC layer of the UE may be configured to not skip multiple PUSCHs that are overlapped with at least one another if each of the multiple PUSCHs is multiplexed with UCI, such as illustrated in connection with 412 of FIG. 4. In other words, under such configuration, MAC layer of the UE may not generate two PDUs and pass both PDUs to the PHY layer because the PHY layer may be expecting one PDU from the MAC layer for the group of overlapping PUSCHs that are not able to be sent in parallel. Thus, the UE may not know which PUSCH to transmit and which PUSCH(s) to skip, and the behavior of the UE regarding uplink skipping may be less deterministic to the serving base station. For example, the UE may select a PUSCH for dropping randomly and/or based on other settings. As such, aspects described herein may enable a UE to make more deterministic decision(s) regarding uplink skipping, such that the base station is more likely to know which PUSCH(s) are multiplexed with a PUCCH/UCI.

In some examples, a UE may identify that at least two PUSCHs may be overlapped at least partially with each other, and at least one of the at least two PUSCHs is multiplexed with PUCCH and at least one of the at least two PUSCHs is not multiplexed with PUCCH. In such examples, the UE may determine which PUSCH to be selected as non-skippable based on the uplink priority of PUSCH, based on whether the PUSCH is carrying UCI, and/or based on whether a PUCCH having a same uplink priority as a PUSCH is to be selected over the PUSCH or vice versa, etc.

Figure 5:
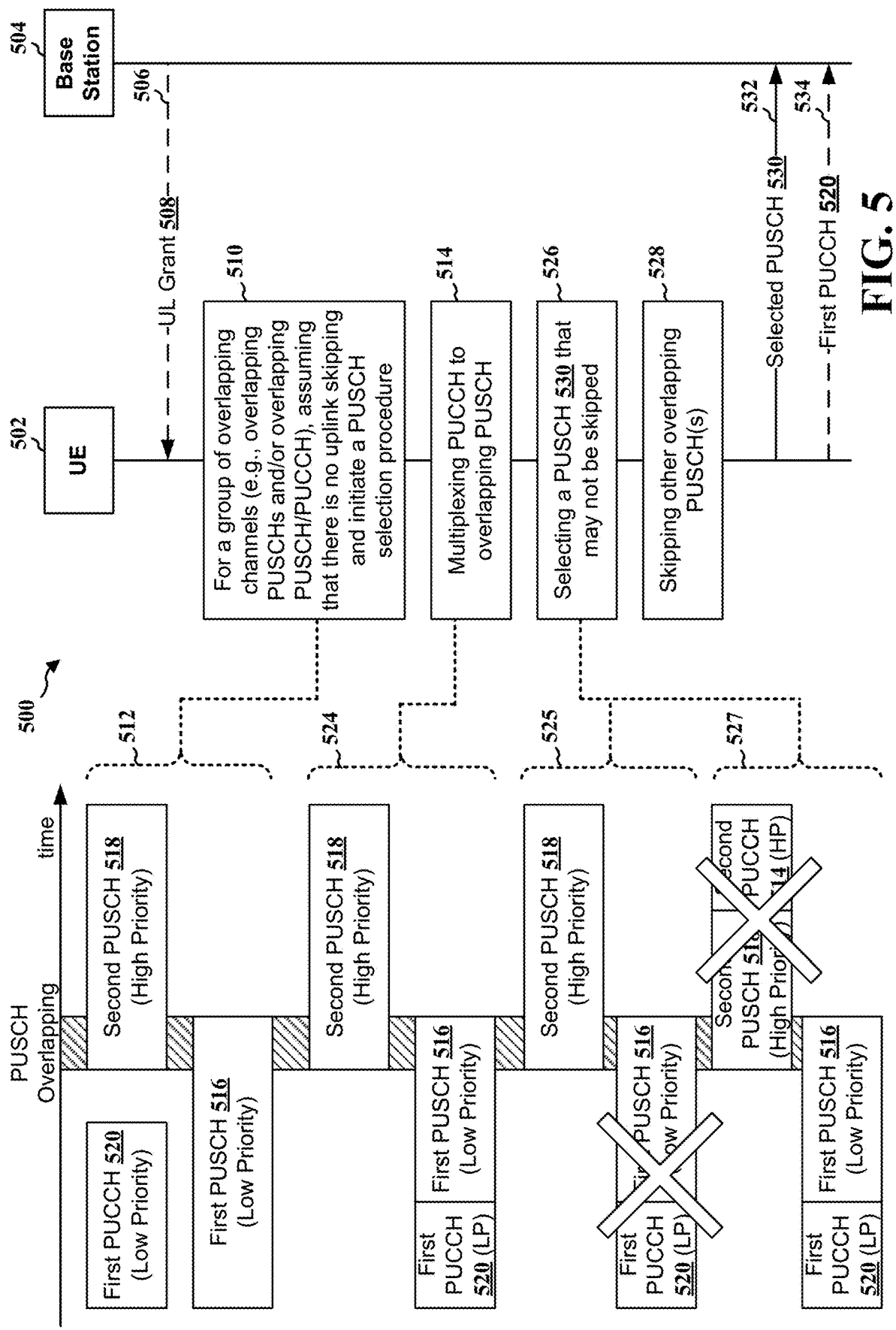
FIG. 5 is a communication flow illustrating an example of a UL skipping determination procedure according to aspects of the present disclosure.

FIG. 5 is a communication flow 500 illustrating an example of UL skipping determination procedure according to aspects of the present disclosure. Aspects presented herein may be applicable to communications involving CA, such as communications involving UL CA.

At 506, a base station 504 may configure one or more UL grants 508 scheduling one or more uplink channels (e.g., PUCCHs and/or PUSCHs) for a UE 502. The base station 504 may assign each of the one or more uplink channels with an uplink priority (e.g., an L1 priority), and the base station may indicate the priorities associated with the one or more uplink channels to the UE 502 using DCI, via RRC signaling, or both.

At 510, as described in connection with 410 of FIG. 4, for a group of overlapping channels (e.g., overlapping PUSCHs or overlapping PUCCH/PUSCH), the UE may assume that there is no uplink skipping, and the UE may initiate a PUSCH selection/skipping procedure to determine which PUSCH(s) may be skipped or may not be skipped (hereafter may collectively refer as "PUSCH transmission determination procedure" or "PUSCH skipping determination procedure"). For example, as shown at 512, the UE 502 may identify that a first PUSCH 516 configured with a low uplink priority may be overlapped with a second PUSCH 518 configured with a high uplink priority, that a first PUCCH 520 configured with low priority may be overlapped with the first PUSCH 516, and that the second PUSCH 518 is not overlapped with a PUCCH, etc.

At 514, for one or more PUCCHs that overlap with PUSCH(s), such as PUCCHs that overlap with any of the overlapped PUSCHs, the UE 502 may multiplex each PUCCH with the corresponding PUSCH in which the PUCCH overlaps. For example, as shown at 524, as the first PUCCH 520 overlaps with the first PUSCH 516, the UE 502 may multiplex the first PUCCH 520 with the first PUSCH 516. In some examples, if the UE 502 does not have the capability, permission, or configuration to multiplex channels of different priorities, the UE 502 may drop a channel that is with a lower priority. For example, if the first PUCCH 520 is configured with a lower priority and the first PUSCH 516 is configured with a high priority and they overlap with each other, the UE 502 may drop the first PUCCH 520.

At 526, the UE 502 may determine/select a PUSCH 530 from the overlapped PUSCHs or the overlapped PUSCH/PUCCH that may not be skipped by the UE 502. As the UE 502 may be configured with different uplink (e.g., L1) priorities, the selection of the PUSCH 530 may be independent of whether a UCI is multiplexed on a PUSCH or not. As such, both the UCI multiplexing and the priority of the channels may be considered by the UE 502 when the UE 502 is determining which PUSCH to be selected as non-skippable. For example, the UE 502 may be configured to make the determination/selection based on the uplink priority associated with each PUSCH and/or whether each PUSCH is multiplexed with PUCCH/UCI, etc.

In one example, if the UE 502 identifies that at least one of the overlapped PUSCHs (e.g., PUSCH that overlaps with at least one other PUSCH) is multiplexed with PUCCH and at least one of the overlapped PUSCHs is not multiplexed with PUCCH, the UE 502 may select the PUSCH 530 based on the uplink/L1 priority associated with the PUSCH 530. For example, as shown at 525, after the UE 502 determines that the first PUSCH 516 is multiplexed with the first PUCCH 520 and the second PUSCH 518 is not multiplexed with PUCCH, the UE 502 may select the second PUSCH 518 as the PUSCH (e.g., the PUSCH 530) that may not be skipped by the UE 502 as the second PUSCH 518 has the highest uplink priority (e.g., higher than the first PUSCH 516). In another example, the selection may be based on whether the PUSCH is multiplexed with UCI. For example, as shown at 527, the UE 502 may select the first PUSCH 516 as the PUSCH (e.g., the PUSCH 530) that may not be skipped by the UE 502 as the first PUSCH 516 is multiplexed with a PUCCH (e.g., the first PUCCH 520). Note that while the example shows the first PUSCH 516 and the second PUSCH 518 are overlapped at least partially with each other, it is merely for illustration. In some examples, the first PUSCH 516 and the second PUSCH 518 may not be overlapped with each other, and may be overlapped with another PUCCH. Similarly, the UE 502 may select a PUSCH following the same rule (based on the uplink/L1 priority associated with the PUSCH or the uplink/L1 priority associated with the PUCCH that is multiplexed on the PUSCH).

At 528, after the UE 502 selects the PUSCH 530 that may not be skipped, the UE 502 may skip/drop other overlapped PUSCHs or the overlapped PUSCH/PUCCH, e.g., PUSCH (s) that overlaps with the PUSCH 530. At 532, the UE 502 may transmit the selected PUSCH 530 to the base station 504. Similarly, after the UE 502 determines one or more PUSCH(s) that are to be skipped by the UE 502, the UE 502 may drop the PUCCH(s) that is multiplexed on the skipped PUSCH(s). For example, after the UE 502 determines to skip/drop the first PUSCH 516, the UE 502 may be configured to skip/drop the first PUCCH 520 that is multiplexed on the first PUSCH 516. In another example, the UE 502 may be configured to not skip/drop the first PUCCH 520 if the first PUCCH 520 does not overlap with another transmission (e.g., PUCCH) with a higher priority. Thus, at 534, the UE 502 may transmit the first PUCCH 520 to the base station 504.

In another aspect of the present disclosure, if a UE has the capability to support cross-priority multiplexing and is configured to apply cross-priority multiplexing, the UE may multiplex a PUCCH to a PUCCH/PUSCH having a different uplink priority. Aspects presented may enable a UE to determine which PUSCH is to be selected as the non-skippable PUSCH when the UE is configured with at least two PUSCHs that are overlapped, and at least one of the at least two overlapped PUSCHs is multiplexed with at least one PUCCH with a different uplink (e.g., L1) priority.

Figure 6:
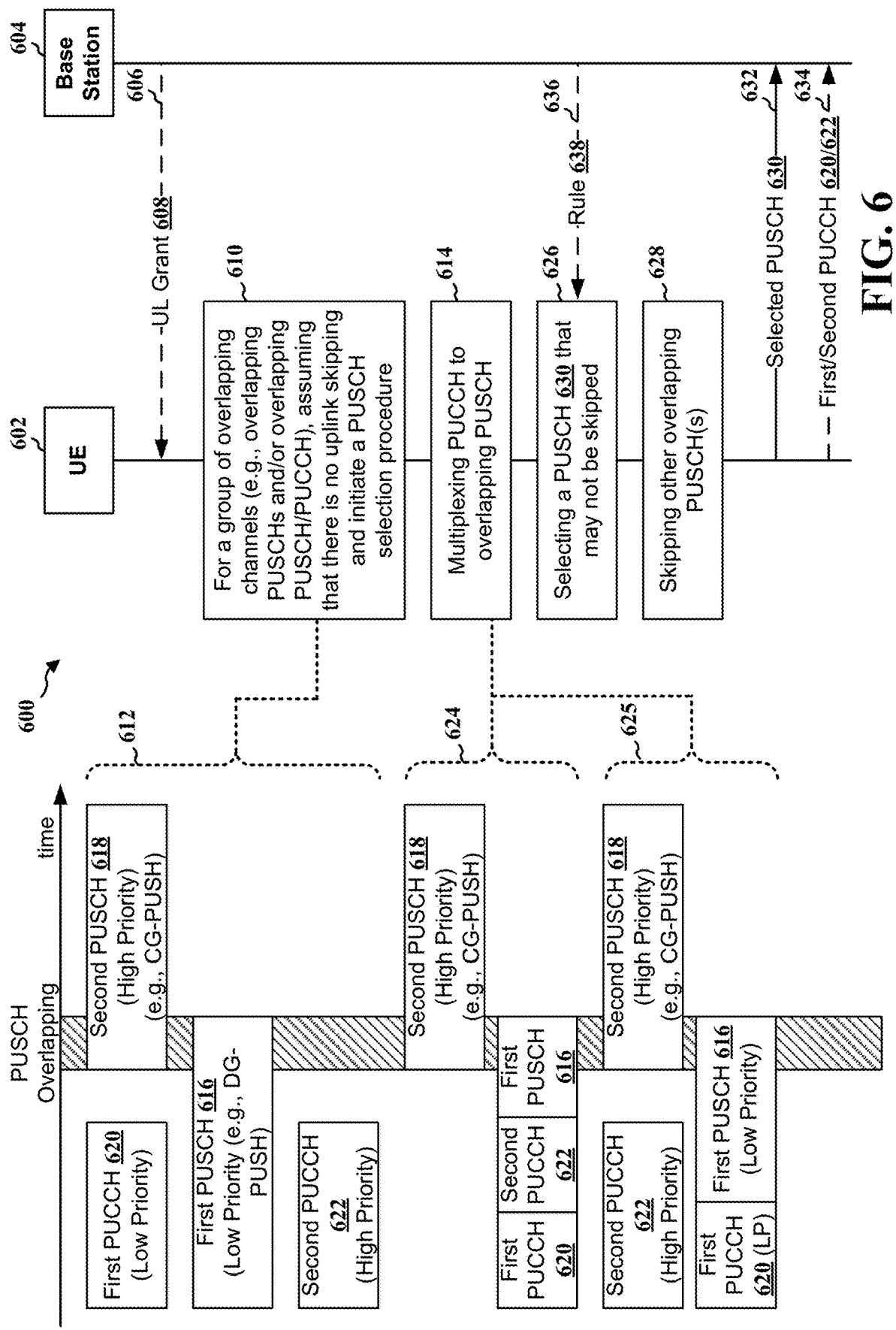
FIG. 6 is a communication flow illustrating an example of a UL skipping determination procedure according to aspects of the present disclosure.

FIG. 6 is a communication flow 600 illustrating an example of an UL skipping determination procedure according to aspects of the present disclosure. Aspects presented herein may be applicable to communications involving CA, such as communications involving UL CA.

At 606, a base station 604 may configure one or more UL grants 608 scheduling one or more uplink channels (e.g., PUCCHs and/or PUSCHs) for a UE 602, which may include a CG-PUSCH, a DG-PUSCH, etc. The base station 604 may assign each of the one or more uplink channels with an uplink priority (e.g., an L1 priority), and the base station may indicate the priorities associated with the one or more uplink channels to the UE 602 using DCI, via RRC signaling, or both. For examples, the base station 604 may indicate the priorities to the UE using DCI for a DG-PUSCH or for a PUCCH in response to the DG-PDSCH, or via RRC signaling for a SR or a CG-PUSCH, etc.

At 610, the UE 602 may identify whether there are overlapping uplink channels, such as a PUSCH overlapping with another PUSCH or a PUCCH overlapping with another PUSCH/PUCCH, etc. If the UE 602 identifies there are overlapping uplink channels, such as at least two PUSCHs are at least partially overlapped with each other (hereafter "overlapped PUSCHs") and at least one PUCCH may be overlapped with at least one of the overlapped PUSCHs, or a PUCCH overlaps with at least two PUSCHs but the at least two PUSCHs are not overlapped with each other (hereafter "overlapped PUCCH/PUSCH"), the UE 602 may be configured to first assume there is no uplink skipping for the overlapping uplink channels (e.g., for the overlapped PUSCHs or the overlapped PUSCH/PUCCH), and the UE may initiate a PUSCH selection/skipping procedure to determine which PUSCH(s) may be skipped or may not be skipped (hereafter may be collectively referred to as a "PUSCH transmission determination procedure" or a "PUSCH skipping determination procedure"). For example, the PHY layer of the UE 602 may be configured to assume that all overlapped PUSCHs or overlapped PUCCH/PUSCH are to be used by the UE for uplink transmissions. In other words, for a group of overlapping PUSCHs and/or PUCCHs that overlap with each other, the UE 602 may be configured to first assume that there is no uplink skipping.

For example, as shown at 612, the UE 602 may identify that a first PUSCH 616 configured with a low uplink priority (e.g., an LP DG PUSCH) may be overlapped with a second PUSCH 618 configured with a high uplink priority (e.g., a HP DG-PUSCH), and that a first PUCCH 620 configured with low priority and a second PUCCH 622 configured with high priority may both overlap with the first PUSCH 616, etc. In another example the UE 602 may identify that a PUCCH may overlap with two PUSCHs (not shown in the figure), where the two PUSCHs may not overlap with each other and/or the two PUSCHs may be on different carriers. Thus, the UE 602 may assume there is no uplink skipping for the overlapped channels, such as for the overlapped first PUSCH 616 and the second PUSCH 618.

At 614, for one or more PUCCHs that overlap with PUSCH(s), such as PUCCHs that overlap with any of the overlapped PUSCHs, the UE 602 may multiplex one or more PUCCHs with the corresponding PUSCH in which the PUCCH overlaps. In one example, as shown at 624, as both the first PUCCH 620 and the second PUCCH 622 overlap with the first PUSCH 616, the UE 602 may multiplex both PUCCHs with the first PUSCH 616. In other words, the UE 602 may perform multiplexing even across different priorities first, and then the UE 602 may decide which PUSCH is to be selected as non-skippable. In another example, as shown at 625, the UE 602 may be configured to multiplex one PUCCH with the first PUSCH 616 based on the priority of the PUCCH, and then the UE 602 may decide which PUSCH is to be selected as non-skippable. For example, the UE 602 may determine that a PUCCH with same priority as the first PUSCH 616 (e.g., the first PUCCH 620) may be multiplexed with the first PUSCH 616, or that the PUCCH with the highest priority (e.g., the second PUCCH 622) may be multiplexed with the first PUSCH 616, etc. As shown at 625, if the UE 602 determines that PUCCH with same priority as the PUSCH is to be multiplexed on the PUSCH, the UE 602 may multiplex the first PUCCH 620 to the first PUSCH 616 as they both are configured with low uplink priority. In other words, the UE 602 may perform multiplexing on a per-priority basis first. Then, the UE may decide which PUSCH may be kept (e.g., to be non-skippable).

At 626, the UE 602 may determine/select a PUSCH 630 from the overlapped PUSCHs or the overlapped PUSCH/PUCCH that may not be skipped by the UE 602 (or skipped by the MAC layer of the UE 602). As the UE 602 may be configured with different uplink (e.g., L1) priorities, the selection of the PUSCH 630 may be independent of whether a UCI is multiplexed on a PUSCH or not. As such, both the UCI multiplexing and the priority of the channels may be considered by the UE 602 when the UE 602 is determining which PUSCH to be selected as non-skippable. For example, the UE 602 may be configured to make the determination/selection based on the uplink priority associated with each PUSCH, based on whether each PUSCH is multiplexed with a PUCCH/UCI, or based on a fixed rule (discussed below).

In one example, if the UE 602 identifies that at least one of the overlapped PUSCHs (e.g., PUSCH that overlaps with at least one other PUSCH) is multiplexed with a PUCCH and at least one of the overlapped PUSCHs is not multiplexed with a PUCCH, the UE 602 may select the PUSCH 630 based on the uplink/L1 priority associated with the PUSCH 630. For example, as shown at 624, after the UE 602 multiplexes the first PUCCH 620 and the second PUCCH 622 with the first PUSCH 616, the UE 602 may select the second PUSCH 618 as the PUSCH (e.g., the PUSCH 630) that may not be skipped by the UE 602, as the second PUSCH 618 has the highest uplink priority (e.g., higher than the first PUSCH 616). In another example, the selection may be based on whether the PUSCH is multiplexed with UCI. For example, the UE 602 may select the first PUSCH 616 as the PUSCH (e.g., the PUSCH 630) that may not be skipped by the UE 602, as the first PUSCH 616 is multiplexed with at least one of the first PUCCH 620 or the second PUCCH 622. Note that while the example shows the first PUSCH 616 and the second PUSCH 618 are overlapped at least partially with each other, it is merely for illustration. In some examples, the first PUSCH 616 and the second PUSCH 618 may not be overlapped with each other, and may be overlapped with another PUCCH. Similarly, the UE 602 may select a PUSCH following the same rule (based on the uplink/L1 priority associated with the PUSCH or the uplink/L1 priority associated with the PUCCH that is multiplexed on the PUSCH).

In another example, a fixed rule may be defined for the UE 602 to determine which PSDCH to select. For example, a rule may define whether a PUSCH multiplexed with a PUCCH is to be selected over a PUSCH that is not multiplexed with a PUCCH when the PUCCH and the PUSCH that is not multiplexed with PUCCH have the same rank. If the rule defines that a PUSCH multiplexed with a PUCCH is to be selected over a PUSCH that is not multiplexed with a PUCCH when the PUCCH and the PUSCH that is not multiplexed with a PUCCH have the same rank (e.g., HP PUCCH/UCI>HP PUSCH, LP PUCCH/UCI>LP PUSCH, etc.), then based on the multiplexing shown at 624, the UE 602 may select the first PUSCH 616 as the PUSCH 630 that may not be skipped because the first PUSCH 616 is multiplexed with a PUCCH (e.g., the second PUCCH 622) that has an uplink priority higher than or equal to the second PUSCH 618. On the other hand, if the rule defines that a PUSCH that is not multiplexed with a PUCCH is to be selected over a PUSCH that is multiplexed with a PUCCH when the PUCCH and the PUSCH that is not multiplexed with a PUCCH have the same rank (e.g., HP PUSCH>HP PUCCH/UCI, LP PUSCH>LP PUCCH/UCI, etc.), then based on the multiplexing shown at 624, the UE 602 may select the second PUSCH 618 as the PUSCH 630 that may not be skipped because the second PUSCH 618 has an uplink priority higher than or equal to one or more PUCCHs (e.g., the first PUCCH 620 and the second PUCCH 622) that are multiplexed on the first PUSCH 616. In some examples, the defined rule may be preconfigured on the UE 602. In other examples, the defined rule may be indicated to the UE 602 by a base station. For example, at 636, the base station 604 may indicate the defined rule (e.g., a rule 638) to the UE 602, such as via an RRC message, a medium access control (MAC)-control element (MAC-CE), and/or downlink control information (DCI), etc.

In another example, if the UE 602 is configured to multiplex one PUCCH (e.g., the first PUCCH 620 or the second PUCCH 622) with the overlapped PUSCH (e.g., the first PUSCH 616), such as based on the priority of the PUCCH, the UE 602 may determine the PUSCH 630 based on the uplink/L1 priorities associated with the first PUSCH 616 and the second PUSCH 618. For example, as shown at 625, if the UE 602 is configured to multiplex a PUCCH with the overlapped PUSCH with a same priority, the UE 602 may multiplex the first PUCCH 620 with the first PUSCH 616 as they both are configured with low (e.g., same) uplink priority. Then, the UE 602 may select the second PUSCH 618 as the PUSCH 630 that may not be skipped because the second PUSCH 618 has an uplink priority higher than the first PUSCH 616. In other words, the PHY layer of the UE 602 may identify the second PUSCH 618 is to be kept by the MAC layer of the UE 602.

In another example, the UE 602 may determine the PUSCH 630 based on the content of the PUCCH. For example, if the first PUSCH 616 is multiplexed with a PUCCH (e.g., the PUCCH 622) that includes specified UCI contents, such as HARQ feedback (ACK/NACK) bits, channel state information (CSI) bits, etc., the UE 602 may select first PUSCH 616 to be non-skippable (i.e., the transmission of the first PUSCH 616 may not be skipped). In other words, if a UE supports cross-priority multiplexing and there are multiple PUSCHs/PUCCHs that are overlapped with at least one another and each PUSCH is multiplexed with a PUCCH/UCI, a UE may select a PUSCH among the multiple PUSCHs based on the contents associated with the PUCCHs that are multiplexed on the multiple PUSCHs (e.g., the PUSCH multiplexed with a PUCCH that has the specified content may be selected).

At 628, after the UE 602 selects the PUSCH 630 that may not be skipped, the UE 602 may skip/drop other overlapped PUSCHs, e.g., PUSCH(s) that overlap(s) with the PUSCH 630. For example, if the UE 602 selects the second PUSCH 618 to be the PUSCH 630 that may not be skipped, the UE 602 may skip/drop the first PUSCH 616 which overlaps with the PUSCH 618. The PHY layer of the UE 602 may indicate to the MAC layer of the UE 602 that the PUSCH 630 is selected not to be skipped, such that the MAC layer of the UE 602 may skip other PUSCHs except the PUSCH 630. For example, the MAC layer of the UE 602 may generate a PDU for the PUSCH 630, and the MAC layer of the UE 602 may not generate PDU(s) for the skipped PUSCH(s).

At 632, the UE 602 may transmit the selected PUSCH 630 to the base station 604. In one example, after the UE 602 determines one or more PUSCH(s) that are to be skipped by the UE 602, the UE 602 may drop the PUCCH(s) that is multiplexed with the skipped PUSCH(s) or the UE 602 may transmit at least one of the PUCCHs if there is no collision. For example, referring to 624 of FIG. 6, if the UE 602 selects the second PUSCH 618 as the PUSCH 630 that may not be skipped, the UE 602 may determine to skip/drop both the first PUSCH 616 and the second PUCCH 622. In another example, the UE 602 may determine to drop/transmit one of the PUCCHs (e.g., the PUCCH with lower/higher uplink priority) or the UE 602 may determine to keep and transmit both the first PUCCH 616 and the second PUCCH 622, such as after they are multiplexed together in case the PUCCHs are overlapping. For example, at 634, the UE 602 may transmit the first PUCCH 620 and/or the second PUCCH 622 to the base station 604. In other words, the UE 602 may drop all PUCCHs/UCI that are not multiplexed with the PUSCH 630 (e.g., the non-skippable PUSCH), or as an alternative, as the UE 602 may know which PUSCH(s) is to be skipped by the MAC layer (because it is overlapping with a non-droppable PUSCH and both cannot be sent in parallel), the UE 602 may transmit the PUCCHs that are not multiplexed with the PUSCH 630 separately, such as after they are multiplexed together in case the PUCCHs are overlapping.

Similarly, if the UE 602 is configured to multiplex one PUCCH (e.g., the first PUCCH 620 or the second PUCCH 622) with the overlapped PUSCH (e.g., the first PUSCH 616) based on the priority of the PUCCH such as shown at 625, in one example, the UE 602 may drop the PUCCH that is multiplexed with the skipped PUSCH(s) (e.g., the first PUCCH 620) and/or the UE 602 may drop the PUCCH that is not multiplexed with any PUSCH (e.g., the second PUCCH 622), etc. In another example, the UE 602 may transmit either one or both, such as in a separate transmission. For example, the UE 602 may transmit both the second PUCCH 622 and the second PUSCH 618, and as an alternative, the UE may transmit the first PUCCH 620 either separately or after multiplexing with another channel if they are overlapping, e.g., with the second PUCCH 622 as they are overlapping. Then, at 634, the UE 602 may transmit the first PUCCH 620 and/or the second PUCCH 622 to the base station 604.

In some examples, prior to multiplexing a PUCCH with an overlapping PUSCH, a UE may be configured to first identify a component carrier (CC) in with which the PUCCH may be multiplexed when multiple CCs are scheduled for a transmission of PUSCHs, where some of the PUSCHs (e.g., CG-PUSCH, DG-PUSCH) may be overlapped in a CC and one or more PUSCHs may be overlapped with one or more PUSCHs in another CC(s), etc.

Figure 7:
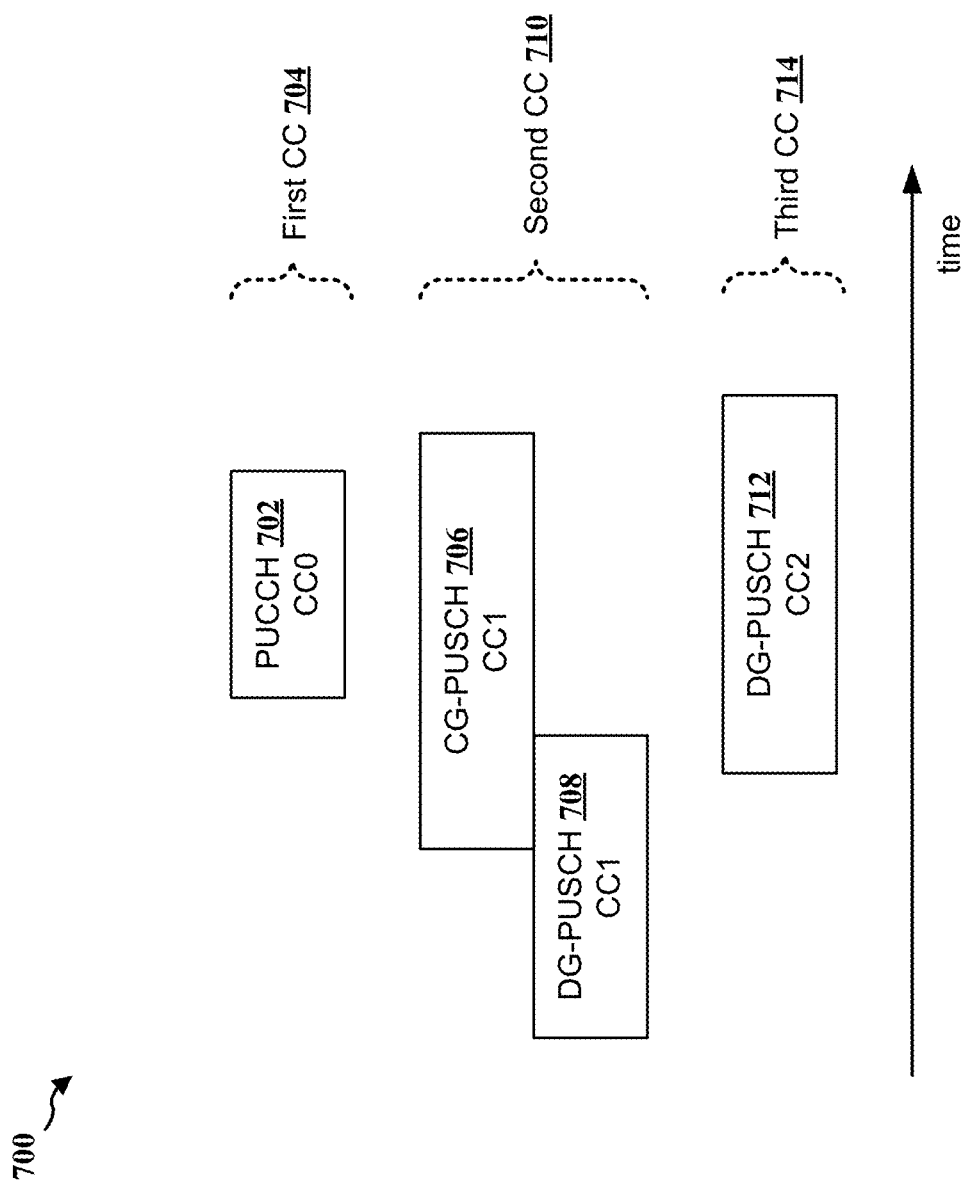
FIG. 7 is a diagram illustrating an example of component carriers (CCs) that include PUSCHs overlapping with each other in a CC or with one or more PUSCHs in another CC.

FIG. 7 is a diagram 700 illustrating an example of CCs that include PUSCHs overlapping with each other in a CC or with one or more PUSCHs in another CC. For example, a PUCCH 702 may be scheduled on a first CC 704 (e.g., CC0), a CG-PUSCH 706 and a DG-PUSCH 708 may be scheduled on a second CC 710 (e.g., CC1), and a DG-PUSCH 712 may be scheduled on a third CC 714 (e.g., CC2). The PUCCH 702 in the first CC 704 may overlap with the CG-PUSCH 706 in the second CC 710 and the DG-PUSCH 712 in the third CC 714, and the CG-PUSCH 706 may further overlap with the DG-PUSCH 708 in the second CC 710.

In some examples, PHY priorities (e.g., L1 priorities) may not be configured for uplink channels at the PHY layer of a UE, but logical channel (LCH) prioritization may be configured for the uplink channels at the MAC layer of the UE. Thus, when there are uplink channels (e.g., PUSCHs) that are overlapped with each other and are unable to be transmitted together, the MAC layer of the UE may determine which uplink channel(s) may be dropped/skipped and/or which uplink channel(s) may not be dropped/skipped based on the LCH prioritization.

For example, referring to FIG. 7, the CG-PUSCH 706, the DG-PUSCH 708, and the DG-PUSCH 712 may not be configured with PHY priorities (e.g., may not be assigned with L1 priorities), but may be configured with LCH prioritization at the MAC layer of a UE. The LCH prioritization may enable the MAC layer of the UE to select a PUSCH for transmission, such as based on whether there is data to transmit (e.g., whether there is data from LCHs of the UE that may be mapped to the PUSCH), and then the MAC layer of the UE may generate a PDU for the selected PUSCH. For example, on the second CC 710, the MAC layer of the UE may select either one of the CG-PUSCH 706 or the DG-PUSCH 708 for transmission, and may generate a PDU for the CG-PUSCH 706 or the DG-PUSCH 708 depending on which one of them is selected by the MAC layer of the UE. If there is no data to be transmitted, the MAC layer of the UE may also decide to skip both the CG-PUSCH 706 and the DG-PUSCH 708 for transmission, and the MAC layer of the UE may not generate a PDU for either one of them.

On the other hand, if the LCH prioritization is not configured/supported for a UE, the UE may be configured to override/drop a CG-PUSCH when the CG-PUSCH collides with a DG-PUSCH. For example, if the CG-PUSCH 706 overlaps with the DG-PUSCH 708 in the second CC 710, a UE that is not configured with LCH prioritization or does not support LCH prioritization may be specified to drop/skip the CG-PUSCH 706 and to transmit the DG-PUSCH 708. However, if the UE is configured with LCH prioritization, the UE may select one of the CG-PUSCH 706 or the DG-PUSCH 708 to drop when they overlap.

In some examples, a UE may be configured to follow a UCI (e.g., PUCCH) multiplexing rule, where the UCI multiplexing rule may specify an order for uplink channels in which the UE may select for multiplexing the UCI. For example, a UCI multiplexing rule may indicate that a UE may select one of multiple overlapping PUSCHs for UCI multiplexing based on an order, where a PUSCH with aperiodic channel state information (A-CSI) may be selected first, then a PUSCH with an earlier start time may be selected next, then a DG-PUSCH may be selected over a CG-PUSCH if they both start at a same time, or if none of these apply, the UE may select a PUSCH based on the CC index, etc. (e.g., PUSCH with A-CSI>PUSCH with an earlier start time>then DG over CG>CC index, etc.). For example, referring to FIG. 7, based on the UCI multiplexing rule, if none of the PUSCHs are configured with A-CSI, a UE may multiplex the PUCCH 702 to the CG-PUSCH 706 as the CG-PUSCH starts earlier. However, if none of the PUSCHs are configured with A-CSI and both the CG-PUSCH 706 and the DG-PUSCH 712 are configured to start at a same time, then the UE may multiplex the PUCCH 702 to the DG-PUSCH 712 as the DG-PUSCH has priority over CG-PUSCH, etc.

In some examples, while the LCH prioritization may enable the MAC layer of the UE to generate a PDU for either the CG-PUSCH 706 or the DG-PUSCH 708 depending on which one of them is selected by the MAC layer, there may be an ambiguity to a base station on which PUSCH is selected by the MAC layer of the UE. For example, the base station may not know whether a PDU for the CG-PUSCH 706 is generated by the MAC layer of the UE or not as the MAC layer of the UE may have selected the DG-PUSCH 708 for transmission and dropped the CG-PUSCH 706, or the MAC layer of the UE may have skipped both PUSCHs, etc. Thus, the base station may not be able to determine which PUSCH is multiplexed with the UCI. For example, referring to FIG. 7, if the CG-PUSCH 706 is selected by the MAC layer of the UE for transmission, the UE may multiplex the PUCCH 702 with the CG-PUSCH 706. If the CG-PUSCH 706 on the second CC 710 is not selected by the MAC layer of the UE for transmission but the DG-PUSCH 712 on the third CC 714 is selected for transmission, then the UE may multiplex the PUCCH 702 with the DG-PUSCH 712. If neither the CG-PUSCH 706 or the DG-PUSCH 712 is selected by the MAC layer of the UE for transmission, then the UE may transmit the PUCCH 702 without multiplexing the PUCCH 702 with any of the CG-PUSCH 706 or the DG-PUSCH 712, etc. As such, it may not be clear to the base station where the PUCCH 702 (e.g., UCI) is transmitted, and the UCI multiplexing behavior at the UE may be less deterministic to the base station.

Aspects presented herein may enable a UE to determine which uplink channel/CC (e.g., CG-PUSCH, DG-PUSCH) is to be selected for transmission when there is an ambiguous on a given carrier (e.g., when it is uncertain which PUSCH is selected by the MAC layer of a UE).

Figure 8:
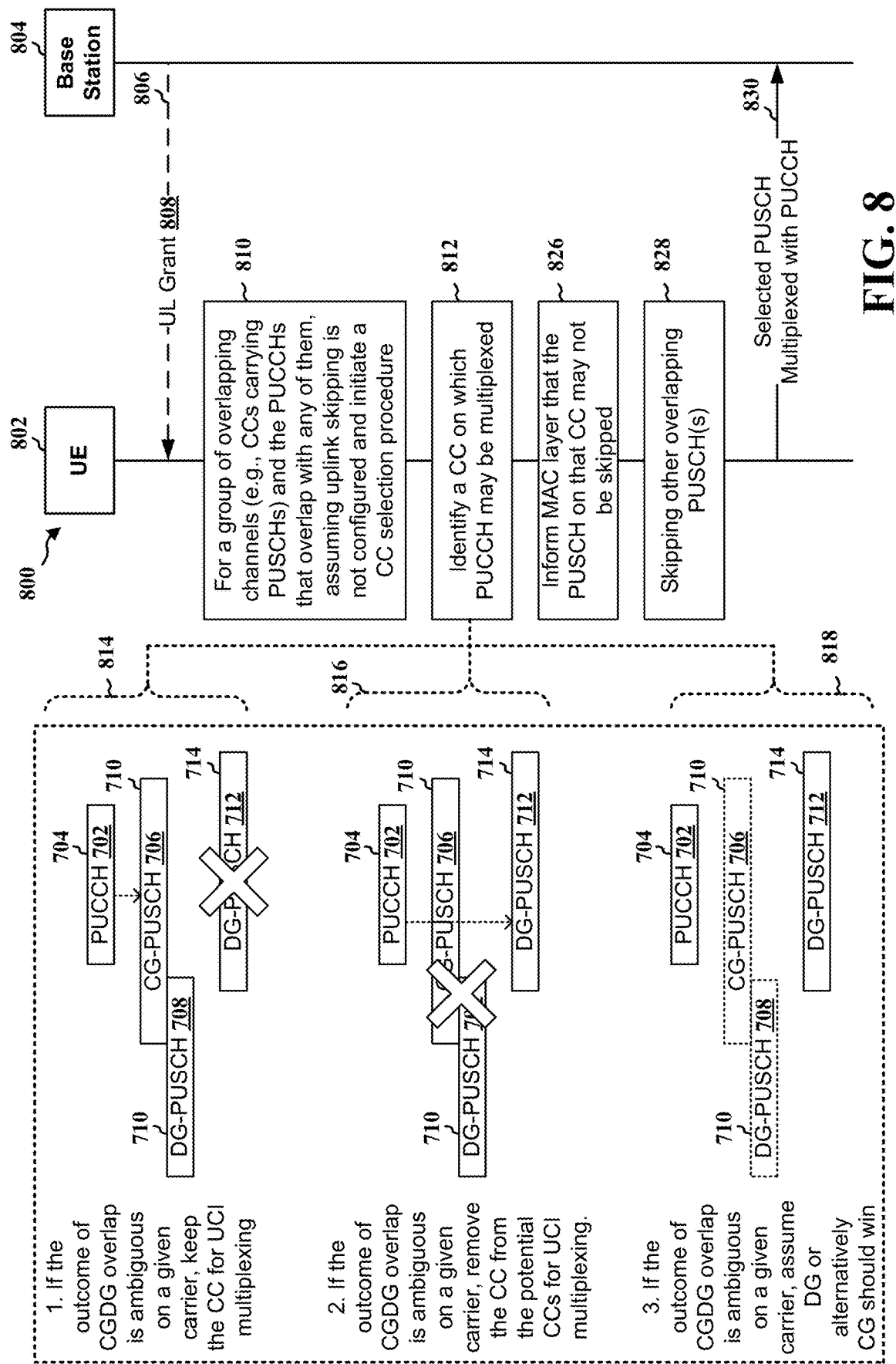
FIG. 8 is a communication flow illustrating an example of a CC determination procedure according to aspects of the present disclosure.

FIG. 8 is a communication flow 800 illustrating an example of a CC determination procedure according to aspects of the present disclosure. Aspects presented herein may be applicable to communications involving CA, such as communications involving UL CA. At 806, a base station 804 may configure one or more UL grants 808 scheduling one or more uplink channels (e.g., PUCCHs and/or PUSCHs) for a UE 802 on multiple CCs, where one or more CCs may carry a CG-PUSCH and/or a DG-PUSCH, etc.

At 810, the UE 802 may identify whether there are overlapping uplink channels within a CC and/or between different CCs, such as a PUSCH overlapping with another PUSCH in a CC and/or a PUSCH overlapping with another PUSCH in another CC, such as shown by the FIG. 7.

At 812, if the UE 802 identifies that at least two PUSCH (s) in a CC are overlapped at least partially with each other and may not be transmitted together, and at least one PUCCH may be overlapped with at least one of the PUSCH (s), the UE 802 may be configured to first assume the uplink skipping is not configured for the CC with overlapping PUSCHs, and the UE 802 may initiate a CC selection procedure to identify a CC on which a PUCCH may be multiplexed with.

In one example, as shown at 814, if an outcome of a PUSCHs overlap involving at least one DG-PUSCH and at least one CG-PUSCH is ambiguous on a CC (e.g., it is not clear to a base station which PUSCH the MAC layer of the UE 802 is keeping or if the MAC layer is not keeping any one of them, etc.), the UE 802 may be configured to keep the CC for UCI multiplexing. For example, based on the example shown in FIG. 7, as the CG-PUSCH 706 overlaps with the DG-PUSCH 708 on the second CC 710 and it may not be clear to the base station 804 which PUSCH is to be selected by the MAC layer of the UE 802 for transmission, the UE 802 may be configured to keep the second CC 710 as a candidate CC for the purpose of UCI multiplexing. As such, both the second CC 710 (e.g., CC1) and the third CC 714 (e.g., CC2) are kept as candidate CCs for UCI multiplexing, and the UE 802 may apply a UCI multiplexing rule to determine which CC is to be selected for UCI multiplexing.

For example, if the UE 802 applies the UCI multiplexing rule that indicates PUSCH with A-CSI>PUSCH with earlier start>then DG over CG>CC index, as the CG-PUSCH 706 at the second CC 710 starts earlier than the DG-PUSCH 712 at the third CC 714, the UE 802 may select the second CC 710 as a carrier that may carry UCI (e.g., PUCCH 702). Then, at 826, the PHY layer of the UE 802 may inform the MAC layer of the UE that the CG-PUSCH 706 on the second CC 710 may not be skipped.

At 828, the UE 802 may skip other overlapping PUSCH (s), and at 830, the UE 802 may multiplex the PUCCH 702 with the CG-PUSCH 706, and the UE 802 may transmit the CG-PUSCH 706 to the base station 804.

In another example, as shown at 816, if an outcome of a PUSCHs overlap involving at least one DG-PUSCH and at least one CG-PUSCH is ambiguous on a CC (e.g., it is not clear to a base station which PUSCH the MAC layer of the UE 802 is keeping or if the MAC layer is not keeping any one of them, etc.), the UE 802 may be configured to remove the CC from candidate CC(s) for UCI multiplexing selection. For example, based on the example shown in FIG. 7, as the CG-PUSCH 706 overlaps with the DG-PUSCH 708 on the second CC 710 and it may not be clear to the base station 804 which PUSCH is to be selected by the MAC layer of the UE 802 for transmission, the UE 802 may be configured to remove the second CC 710 as a candidate for the purpose of UCI multiplexing. Then, the UE 802 may apply a UCI multiplexing rule to other candidate CCs to determine which CC may be selected for UCI multiplexing. As the third CC 714 is the sole candidate CC in this example, the UE 802 may select the, the UE 802 may select the third CC 714 as a carrier that may carry UCI (e.g., PUCCH 702). Then, at 826, the PHY layer of the UE 802 may inform the MAC layer of the UE that the DG-PUSCH 712 on the third CC 714 may not be skipped.

At 828, the UE 802 may skip other overlapping PUSCH (s), and at 830, the UE 802 may multiplex the PUCCH 702 with the DG-PUSCH 712, and the UE 802 may transmit the DG-PUSCH 712 to the base station 804.

In some examples, at 816, the UE 802 may determine that all CCs are ambiguous as all CCs are carrying at least one DG-PUSCH overlapping at least one CG-PUSCH. In such examples, the UE 802 may transmit the PUCCH (e.g., PUCCH 702) and drop all PUSCH transmissions on all CCs. Alternative, the UE 802 may drop all transmissions including the PUCCH.

In another example, as shown at 818, if an outcome of a PUSCHs overlap involving at least one DG-PUSCH and at least one CG-PUSCH is ambiguous on a CC (e.g., it is not clear to a base station which PUSCH the MAC layer of the UE 802 is keeping or if the MAC layer is not keeping any one of them, etc.), the UE 802 may be configured to assume that one of the DG-PUSCH or the CG-PUSCH is to be selected by the MAC layer of the UE 802 in that CC. For example, based on the example shown in FIG. 7, as the CG-PUSCH 706 overlaps with the DG-PUSCH 708 on the second CC 710 and it may not be clear to the base station 804 which PUSCH is to be selected by the MAC layer of the UE 802 for transmission, the UE 802 may be configured to always assume that DG-PUSCH is to be selected over CG-PUSCH or vice versa.

For example, if the UE 802 assumes DG-PUSCH is to be selected over CG-PUSCH, then the UE 802 may assume the MAC layer is skipping the CG-PUSCH 706. As there is no PUSCH for the UE 802 to multiplex the PUCCH 702 with at the second CC 710, the UE 802 may remove the second CC 710 from the candidate CCs for UCI multiplexing. Then, the UE 802 may apply a UCI multiplexing rule to the candidate CCs to determine which CC may be selected for UCI multiplexing. As the third CC 714 is the sole candidate CC in this example, the UE 802 may select the third CC 714 as a carrier that may carry UCI (e.g., PUCCH 702). Then, at 826, the PHY layer of the UE 802 may inform the MAC layer of the UE that the DG-PUSCH 712 on the third CC 714 may not be skipped. At 828, the UE 802 may skip other overlapping PUSCH(s), and at 830, the UE 802 may multiplex the PUCCH 702 with the DG-PUSCH 712, and the UE 802 may transmit the DG-PUSCH 712 to the base station 804.

Note that the assumption made by the PHY layer of the UE about the third CC 714 may be for the purpose of selecting a carrier for UCI multiplexing. The MAC layer of the UE may still apply its prioritization and decide to generate a PDU for the DG-PUSCH 708 or the CG-PUSCH 706 or none of them. However, regardless whether PDU is generated for either one of the PUSCHs, the UCI is multiplexed on a deterministic CC.

On the other hand, if the UE 802 assumes CG-PUSCH is to be selected over DG-PUSCH, then the UE 802 may assume the MAC layer is skipping the DG-PUSCH 708 and is transmitting the CG-PUSCH 706. As the PUCCH 702 may be multiplexed with the CG-PUSCH 706 on the second CC 710, the second CC 710 may be selected by the UE 802 as a candidate CC for UCI multiplexing. As such, both the second CC 710 (e.g., CC1) and the third CC 714 (e.g., CC2) may be kept as candidate CCs for UCI multiplexing, and the UE 802 may apply a UCI multiplexing rule to the candidate CCs to determine which CC may be selected for UCI multiplexing. For example, if the UE 802 applies the UCI multiplexing rule that indicates PUSCH with A-CSI>PUSCH with earlier start>then DG over CG>CC index, as the CG-PUSCH 706 at the second CC 710 starts earlier than the DG-PUSCH 712 at the third CC 714, the UE 802 may select the second CC 710 as a carrier that may carry UCI (e.g., PUCCH 702). Then, at 826, the PHY layer of the UE 802 may inform the MAC layer of the UE that the CG-PUSCH 706 on the second CC 710 may not be skipped. At 828, the UE 802 may skip other overlapping PUSCH(s), and at 830, the UE 802 may multiplex the PUCCH 702 with the CG-PUSCH 706, and the UE 802 may transmit the CG-PUSCH 706 to the base station 804.

If there are multiple CCs that have DG-PUSCH overlapping CG-PUSCH, the UE 802 may apply aspects described in connection with 814, 816 and/or 818 to each CC that have DG-PUSCH overlapping CG-PUSCH to determine a set of candidate CCs, and then the UE 802 may apply a UCI multiplexing rule to the set of candidate CCs to determine which CC may be selected for UCI multiplexing.

Aspects described in connection with FIGS. 7 and 8 may also apply to CCs carrying.

PUSCHs that are configured with PHY layer priorities. In one aspect, as an alternatively, when a UE is determining which CC(s) may be removed, the UE may also take the PHY priorities into consideration. For example, as shown by diagram 900 of FIG. 9, on the second CC 910, a HP DG-PUSCH 908 may overlap with a LP CG-PUSCH 906. The PHY layer of the UE may determine that a PUSCH with a higher priority may be selected. For example, the HP DG-PUSCH 908 may be selected by the PHY layer of the UE, and the LP CG-PUSCH 906 may be dropped by the PHY layer of the UE. As such, a HP PUCCH 902 on a first CC 904 may be multiplexed with the HP DG-PUSCH 908 on the second CC 910, and the PHY layer of the UE may inform the MAC layer of the UE that the HP DG-PUSCH 908 on the second CC 910 may not be skipped.

In some examples, there may be no LP DG-PUSCH (e.g., 912) on the third CC 914, but there may be a HP PUSCH 916 that overlaps with the PUCCH 902. In such examples, there may be an ambiguity at a base station about which HP-PUSCH (e.g., the PUSCH on the second CC 910 or the PUSCH on the third CC 914) may be used by the UE for UCI multiplexing as it may depend on the MAC PDU generation. Similarly, aspects described in connection with FIGS. 7 and 8 may apply, where CCs with ambiguity may be removed from candidate CCs for UCI multiplexing. If there is any candidate CC(s) remained, a CC may be selected for UCI multiplexing from the candidate CC(s) (e.g., the UCI multiplexing rule may apply if there are multiple candidate CCs). If there is no candidate CC, the UE may be configured to select a CC from the ambiguous ones (e.g., based on a UCI multiplexing rule) and select a PUSCH that has a same priority as the PUCCH (e.g., PUCCH 902). Then, the UE may indicate to the MAC layer of the UE that the PUSCH on the chosen CC may not be skipped.

Figure 10:
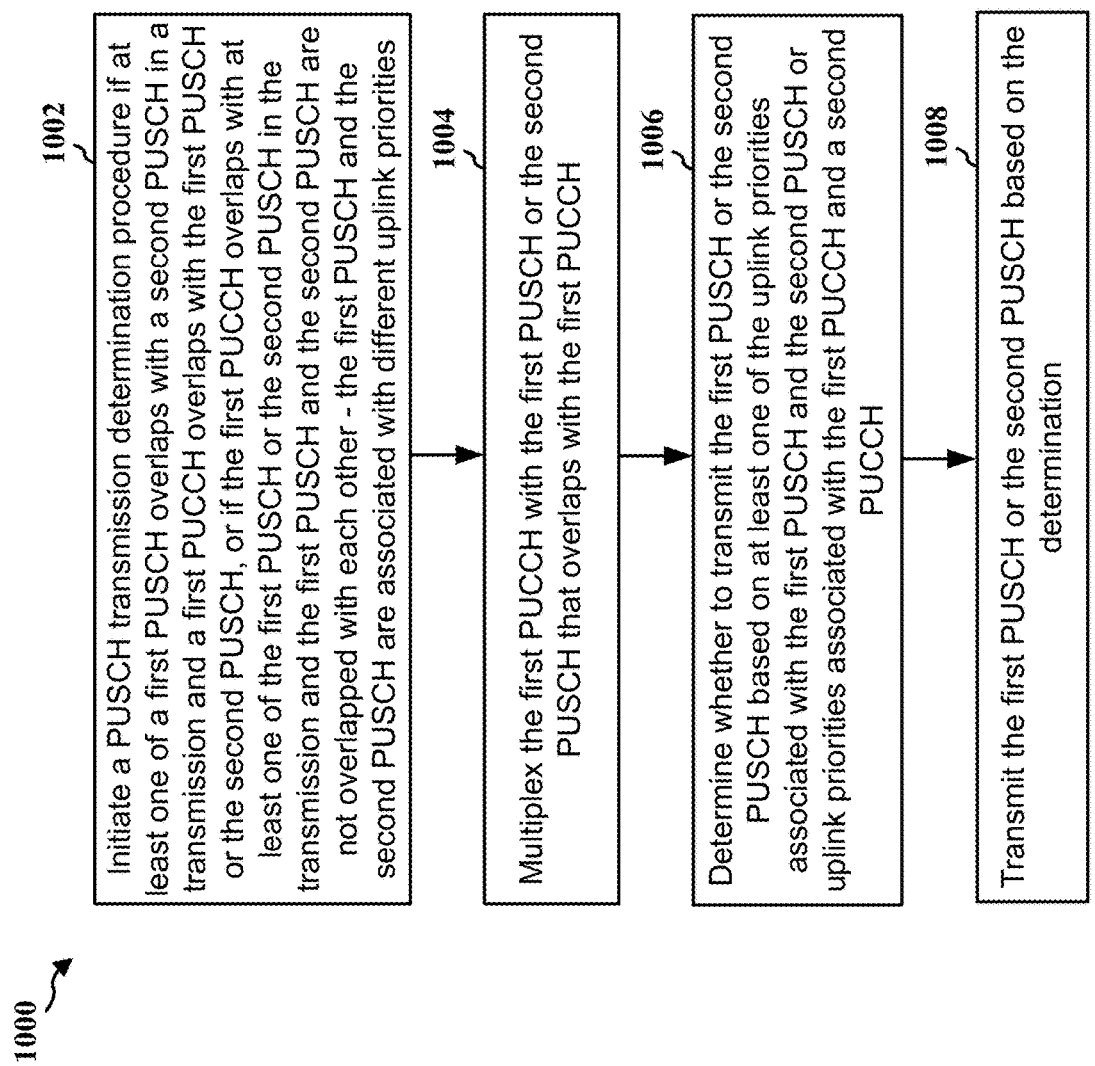
FIG. 10 is a flowchart of a method of wireless communication in accordance with aspects presented herein.

FIG. 10 is a flowchart 1000 of a method of wireless communication. The method may be performed by a UE or a component of a UE (e.g., the UE 104, 350, 402, 502, 602; the apparatus 1102; a processing system, which may include the memory 360 and which may be the entire UE 350 or a component of the UE 350, such as the TX processor 368, the RX processor 356, and/or the controller/processor 359). The method may enable the UE to determine whether to skip one or more overlapping transmissions that may involve PUCCH/UCI multiplexing based at least in part on uplink priorities associated with the overlapping transmissions.

At 1002, the UE may initiate a PUSCH transmission determination procedure if at least one of a first PUSCH overlaps with a second PUSCH in a transmission and a first PUCCH overlaps with the first PUSCH or the second PUSCH, or if the first PUCCH overlaps with at least one of the first PUSCH or the second PUSCH in the transmission and the first PUSCH and the second PUSCH are not overlapped with each other, the first PUSCH and the second PUSCH being associated with different uplink priorities, such as described in connection with FIGS. 4 and 6. For example, at 410, for a group of overlapping channels (e.g., overlapping PUSCHs and/or overlapping PUCCH/PUSCHs), the UE 402 may initiate a PUSCH selection (e.g., determination/skipping) procedure. The initiation of the PUSCH transmission determination procedure may be performed, e.g., by the uplink skipping process component 1140 of the apparatus 1102 in FIG. 11.

In one example, the uplink priorities associated with the first PUSCH and the second PUSCH may be based on whether the first PUSCH or the second PUSCH is a DG-PUSCH or a CG-PUSCH.

At 1004, the UE may multiplex the first PUCCH with the first PUSCH or the second PUSCH that overlaps with the first PUCCH, such as described in connection with FIGS. 4 and 6. For example, at 414, the UE 402 may multiplex PUCCH to overlapping PUSCH. The multiplexing may be performed, e.g., by the multiplexer component 1142 of the apparatus 1102 in FIG. 11.

At 1006, the UE may determine whether to transmit the first PUSCH or the second PUSCH based on at least one of the uplink priorities associated with the first PUSCH and the second PUSCH or uplink priorities associated with the first PUCCH and a second PUCCH, such as described in connection with FIGS. 4 and 6. For example, at 426, the UE 402 may select a PUSCH 430 that may not be skipped, and may be used for transmission based at least in part on uplink priorities associated with one or more PUSCHs and/or one or more PUSCHs. The determination of whether to transmit the first PUSCH or the second PUSCH may be performed, e.g., by the transmission determination component 1144 of the apparatus 1102 in FIG. 11.

In one example, the determination whether to transmit the first PUSCH or the second PUSCH may be performed at a PHY layer of the UE, and the PHY layer may also indicate the determination to transmit the first PUSCH or the second PUSCH to a MAC layer of the UE. In such an example, the MAC layer may generate PDUs for a PUSCH indicated by the PHY layer and skips generating PDUs for a PUSCH not indicated by the PHY layer.

At 1008, the UE may transmit the first PUSCH or the second PUSCH based on the determination, such as described in connection with FIGS. 4 and 6. For example, at 434, the UE 402 may transmit the selected PUSCH 430 to the base station 404. The transmission of the first PUSCH or the second PUSCH may be performed, e.g., by the PUSCH component 1146 and/or transmission component 1134 of the apparatus 1102 in FIG. 11.

In one example, as described in connection with FIG. 4, the second PUSCH may be configured with a high uplink priority and the first PUSCH may be configured with a low uplink priority, the first PUCCH may be multiplexed with the first PUSCH, and the second PUCCH may be multiplexed with the second PUSCH. In such an example, the UE may transmit the second PUSCH and skips a transmission of the first PUSCH. In such an example, the UE may also skip a transmission of the first PUCCH, or the UE may transmit the first PUCCH if the first PUCCH does not overlap with one or more uplink transmissions with a high uplink priority.

In some examples, as described in connection with FIGS. 5 and 6, the UE may have a capability to multiplex a PUCCH with at least one of another PUCCH or a PUSCH having a different uplink priority. In such examples, the first PUCCH may be multiplexed with the first PUSCH or the second PUSCH that has a different uplink priority from the first PUCCH.

In one example, the determining whether to transmit the first PUSCH or the second PUSCH may be based on the uplink priorities associated with the first PUSCH and the second PUSCH. In such an example, if the first PUCCH is multiplexed with the second PUSCH and the second PUSCH has a lower uplink priority than the first PUCCH, the UE may transmit the second PUSCH and skips a transmission of the first PUSCH. The UE may also transmit the first PUCCH, or skips a transmission for the first PUCCH (e.g., skips the first PUCCH).

In another example, the determining whether to transmit the first PUSCH or the second PUSCH may be based on uplink priorities associated with the first PUCCH and the second PUCCH. In such an example, the UE may apply a rule indicating that a PUSCH configured with a low priority and multiplexed with a PUCCH configured with a high uplink priority is to be selected over a PUSCH configured with a high uplink priority and not multiplexed with a PUCCH. As an alternatively, in another example, the UE may apply a rule indicating that a PUSCH configured with a high uplink priority and not multiplexed with a PUCCH is to be selected over a PUSCH configured with a low priority and is multiplexed with a PUCCH configured with a high uplink priority. The rule may be indicated to the UE by a base station via at least one of an RRC message, a MAC-CE, or DCI, such as described in connection with 636 of FIG. 6.

In another example, as described in connection with FIGS. 5 and 6, the first PUCCH may be multiplexed with the first PUSCH, the first PUCCH and the first PUSCH being having a same uplink priority, and the determining whether to transmit the first PUSCH or the second PUSCH may be based on the uplink priorities associated with the first PUSCH and the second PUSCH. For example, when the second PUSCH has an uplink priority higher than the first PUSCH, the UE may transmit the second PUSCH and skips a transmission of the first PUSCH. In such an example, the UE may transmit at least one of the first PUCCH or the second PUCCH to a base station.

Figure 11:
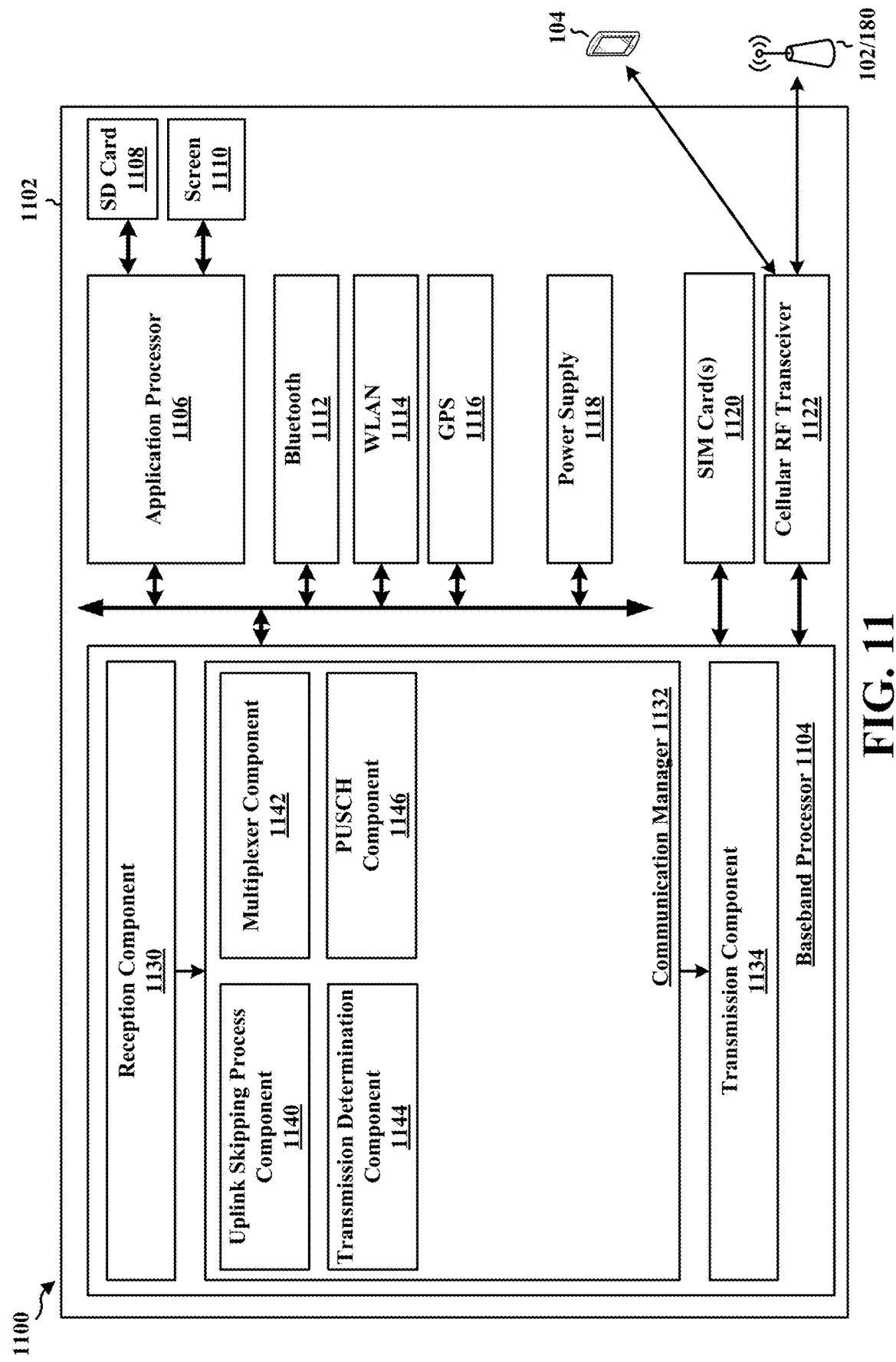
FIG. 11 is a diagram illustrating an example of a hardware implementation for an example apparatus in accordance with aspects presented herein.

FIG. 11 is a diagram 1100 illustrating an example of a hardware implementation for an apparatus 1102. The apparatus 1102 is a UE and includes a baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The baseband processor 1104 communicates through the cellular RF transceiver 1122 with the UE 104 and/or BS 102/180. The baseband processor 1104 may include a computer-readable medium/memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described supra. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes uplink skipping process component 1140 that is configured to initiate a PUSCH transmission determination procedure when at least one of a first PUSCH overlaps with a second PUSCH in a transmission and a first PUCCH overlaps with the first PUSCH or the second PUSCH, or when the first PUCCH overlaps with at least one of the first PUSCH or the second PUSCH in the transmission and the first PUSCH and the second PUSCH are not overlapped with each other, the first PUSCH and the second PUSCH being associated with different uplink priorities, e.g., as described in connection with 1002 of FIG. 10. The communication manager 1132 further includes a multiplexer component 1142 that is configured to multiplex the first PUCCH with the first PUSCH or the second PUSCH that overlaps with the first PUCCH, e.g., as described in connection with 1004 of FIG. 10. The communication manager 1132 further includes a transmission determination component 1144 that is configured to determine whether to transmit the first PUSCH or the second PUSCH based on at least one of the uplink priorities associated with the first PUSCH and the second PUSCH or uplink priorities associated with the first PUCCH and a second PUCCH, e.g., as described in connection with 1006 of FIG. 10. The communication manager 1132 further includes a PUSCH component 1146 that is configured to transmit the first PUSCH or the second PUSCH based on the determination, e.g., as described in connection with 1008 of FIG. 10.

The apparatus may include additional components that perform each of the blocks of the algorithm in the flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for initiating a PUSCH transmission determination procedure when at least one of a first PUSCH overlaps with a second PUSCH in a transmission and a first PUCCH overlaps with the first PUSCH or the second PUSCH, the first PUSCH and the second PUSCH being associated with different uplink priorities (e.g., the uplink skipping process component 1140). The apparatus 1102 includes means for multiplexing the first PUCCH with the first PUSCH or the second PUSCH that overlaps with the first PUCCH (e.g., the multiplexer component 1142). The apparatus 1102 includes means for determining whether to transmit the first PUSCH or the second PUSCH based on at least one of the uplink priorities associated with the first PUSCH and the second PUSCH or uplink priorities associated with the first PUCCH and a second PUCCH (e.g., the transmission determination component 1144). The apparatus 1102 includes means for transmitting the first PUSCH or the second PUSCH based on the determination (e.g., the PUSCH component 1146 and/or the transmission component 1134).

In one configuration, the uplink priorities associated with the first PUSCH and the second PUSCH may be based on whether the first PUSCH or the second PUSCH is a DG-PUSCH or a CG-PUSCH.

In one configuration, the determination whether to transmit the first PUSCH or the second PUSCH may be performed at a PHY layer of the UE, and the PHY layer may also indicate the determination to transmit the first PUSCH or the second PUSCH to a MAC layer of the UE. In such configuration, the MAC layer may generate PDUs for a PUSCH indicated by the PHY layer and skips generating PDUs for a PUSCH not indicated by the PHY layer.

In one configuration, the second PUSCH may be configured with a high uplink priority and the first PUSCH may be configured with a low uplink priority, the first PUCCH may be multiplexed with the first PUSCH, and the second PUCCH may be multiplexed with the second PUSCH. In such configuration, the UE may transmit the second PUSCH and skips a transmission of the first PUSCH. In such configuration, the UE may also skip a transmission of the first PUCCH, or the UE may transmit the first PUCCH if the first PUCCH does not overlap with one or more uplink transmissions with a high uplink priority.

In some configurations, the UE may have a capability to multiplex a PUCCH with at least one of another PUCCH or a PUSCH having a different uplink priority. In such configurations, the first PUCCH may be multiplexed with the first PUSCH or the second PUSCH that has a different uplink priority from the first PUCCH.

In one configuration, the determining whether to transmit the first PUSCH or the second PUSCH may be based on the uplink priorities associated with the first PUSCH and the second PUSCH. In such configuration, when the first PUCCH is multiplexed with the second PUSCH and the second PUSCH has a lower uplink priority than the first PUCCH, the UE may transmit the second PUSCH and skips a transmission of the first PUSCH. In such configuration, the UE may also transmit the first PUCCH, or skips a transmission for the first PUCCH.

In another configuration, the determining whether to transmit the first PUSCH or the second PUSCH may be based on uplink priorities associated with the first PUCCH and the second PUCCH. In such configuration, the UE may apply a rule indicating that a PUSCH configured with a low priority and multiplexed with a PUCCH configured with a high uplink priority is to be selected over a PUSCH configured with a high uplink priority and not multiplexed with a PUCCH. As an alternatively, in another configuration, the UE may apply a rule indicating that a PUSCH configured with a high uplink priority and not multiplexed with a PUCCH is to be selected over a PUSCH configured with a low priority and is multiplexed with a PUCCH configured with a high uplink priority. In such configuration, the rule may be indicated to the UE by a base station via at least one of an RRC message, a MAC-CE, or DCI.

In another configuration, the first PUCCH may be multiplexed with the first PUSCH, the first PUCCH and the first PUSCH being having a same uplink priority, and the determining whether to transmit the first PUSCH or the second PUSCH may be based on the uplink priorities associated with the first PUSCH and the second PUSCH. In such configuration, when the second PUSCH has an uplink priority higher than the first PUSCH, the UE may transmit the second PUSCH and skips a transmission of the first PUSCH. In such configuration, the UE may transmit at least one of the first PUCCH or the second PUCCH to a base station.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
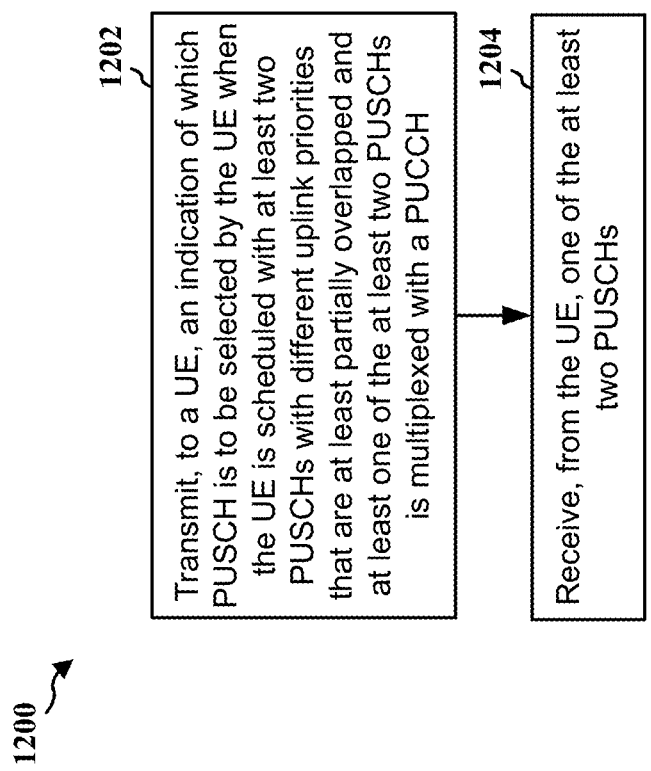
FIG. 12 is a flowchart of a method of wireless communication in accordance with aspects presented herein.

FIG. 12 is a flowchart 1200 of a method of wireless communication. The method may be performed by a base station or a component of a base station (e.g., the base station 102, 180, 310, 404, 504, 604; the apparatus 1302; a processing system, which may include the memory 376 and which may be the entire base station 310 or a component of the base station 310, such as the TX processor 316 the RX processor 370, and/or the controller/processor 375). The method may enable the base station to configure a UE to determine when the UE may skip one or more overlapping uplink transmissions.

At 1202, the base station may transmit, to a UE, an indication of which PUSCH is to be selected by the UE when the UE is scheduled with at least two PUSCHs with different uplink priorities that are at least partially overlapped and at least one of the at least two PUSCHs is multiplexed with a PUCCH, such as described in connection with FIGS. 4 and 6. For example, at 636, the base station 604 may transmit a rule 638 that defines which PSDCH may be selected by the UE when the UE is scheduled with at least two PUSCHs with different uplink priorities that are at least partially overlapped and at least one of the at least two PUSCHs is multiplexed with a PUCCH. The transmission of the indication may be performed, e.g., by the PUSCH selecting indication component 1340 and/or the transmission component 1334 of the apparatus 1302 in FIG. 13.

At 1204, the base station may receive, from the UE, one of the at least two PUSCHs, such as described in connection with FIG. 6. For example, at 632, the base station 604 may receive, from the UE 602, the PUSCH 630 selected by the UE 602 based on the rule 638. The reception of the PUSCH may be performed, e.g., by the PUSCH process component 1342 and/or the reception component 1330 of the apparatus 1302 in FIG. 13.

In one example, the at least two PUSCHs may include at least a first PUSCH configured with a low uplink priority and a second PUSCH configured with a high uplink priority, and the PUCCH may be configured with a high uplink priority and may overlap with the first PUSCH. In such an example, the UE may apply a rule that indicates a PUSCH configured with low uplink priority and multiplexed with a PUCCH configured with a high uplink priority is to be selected over a PUSCH configured with a high uplink priority and not multiplexed with a PUCCH, and the base station may receive the first PUSCH from the UE. As an alternative, the UE may apply a rule that indicates a PUSCH configured with a high uplink priority and not multiplexed with a PUCCH is to be selected over a PUSCH configured with low uplink priority and multiplexed with a PUCCH configured with a high uplink priority, and the base station may receive the second PUSCH from the UE. In such an example, the base station may indicate the rule to the UE via at least one of an RRC message, a MAC-CE, or DCI.

Figure 13:
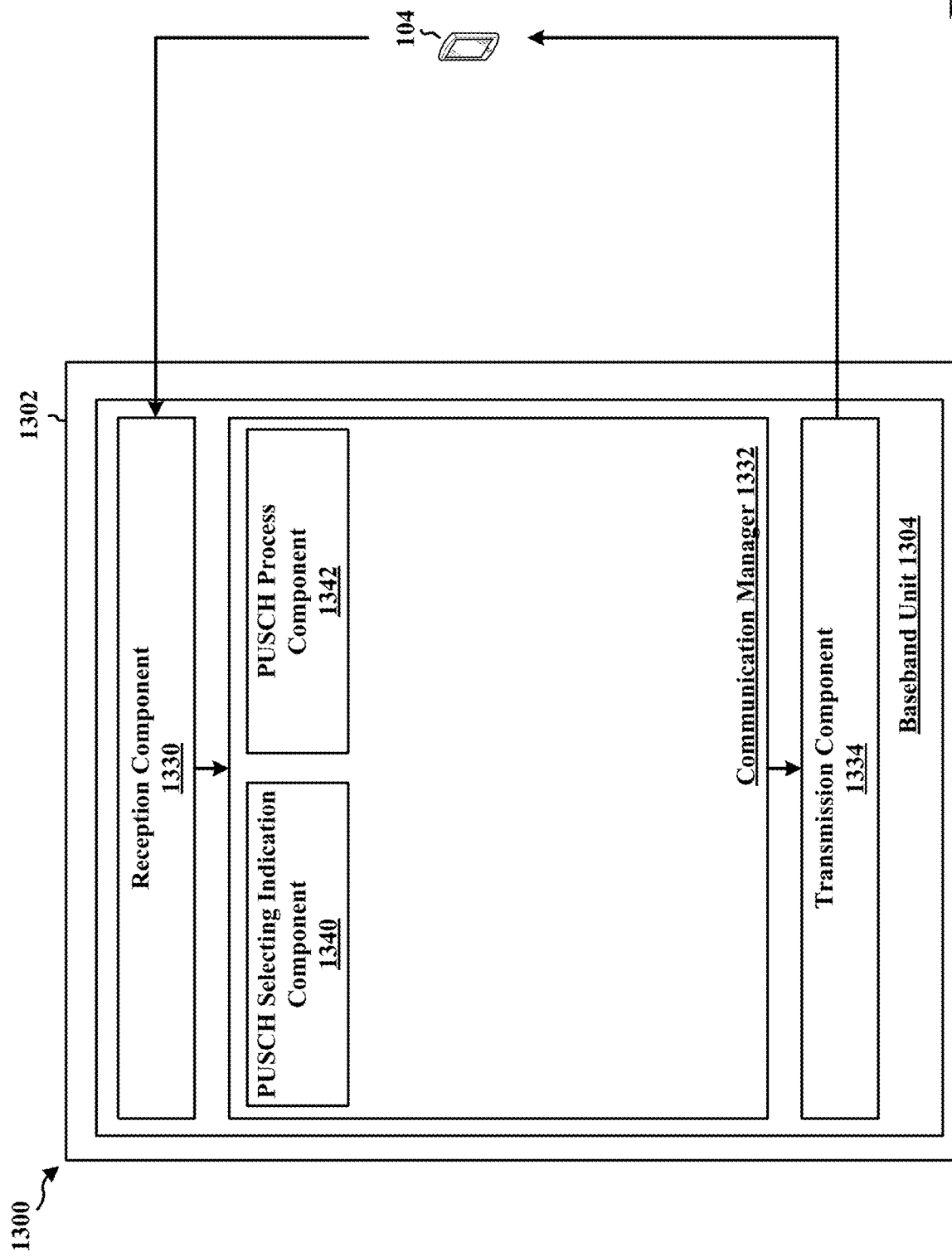
FIG. 13 is a diagram illustrating an example of a hardware implementation for an example apparatus in accordance with aspects presented herein.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a PUSCH selecting indication component 1340 that is configured to transmit, to a UE, an indication of which PUSCH is to be selected by the UE when the UE is scheduled with at least two PUSCHs with different uplink priorities that are at least partially overlapped and at least one of the at least two PUSCHs is multiplexed with a PUCCH, e.g., as described in connection with 1202 of FIG. 12. The communication manager 1332 further includes a PUSCH process component 1342 that is configured to receive, from the UE, one of the at least two PUSCHs, e.g., as described in connection with 1204 of FIG. 12.

The apparatus may include additional components that perform each of the blocks of the algorithm in the flowchart of FIG. 12. As such, each block in the flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a UE, an indication of which PUSCH is to be selected by the UE when the UE is scheduled with at least two PUSCHs with different uplink priorities that are at least partially overlapped and at least one of the at least two PUSCHs is multiplexed with a PUCCH (e.g., the PUSCH selecting indication component 1340 and/or the transmission component 1334). The apparatus 1302 includes means for receiving, from the UE, one of the at least two PUSCHs (e.g., the PUSCH component 1342 and/or the reception component 1330).

In one configuration, the at least two PUSCHs may include at least a first PUSCH configured with a low uplink priority and a second PUSCH configured with a high uplink priority, and the PUCCH may be configured with a high uplink priority and may overlap with the first PUSCH. In such configuration, the UE may apply a rule that indicates a PUSCH configured with low uplink priority and multiplexed with a PUCCH configured with a high uplink priority is to be selected over a PUSCH configured with a high uplink priority and not multiplexed with a PUCCH, and the base station may receive the first PUSCH from the UE. As an alternative, the UE may apply a rule that indicates a PUSCH configured with a high uplink priority and not multiplexed with a PUCCH is to be selected over a PUSCH configured with low uplink priority and multiplexed with a PUCCH configured with a high uplink priority, and the base station may receive the second PUSCH from the UE. In such configuration, the base station may indicate the rule to the UE via at least one of an RRC message, a MAC-CE, or DCI.

The means may be one or more of the components of the apparatus 1302 configured to perform the functions recited by the aforementioned means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 14:
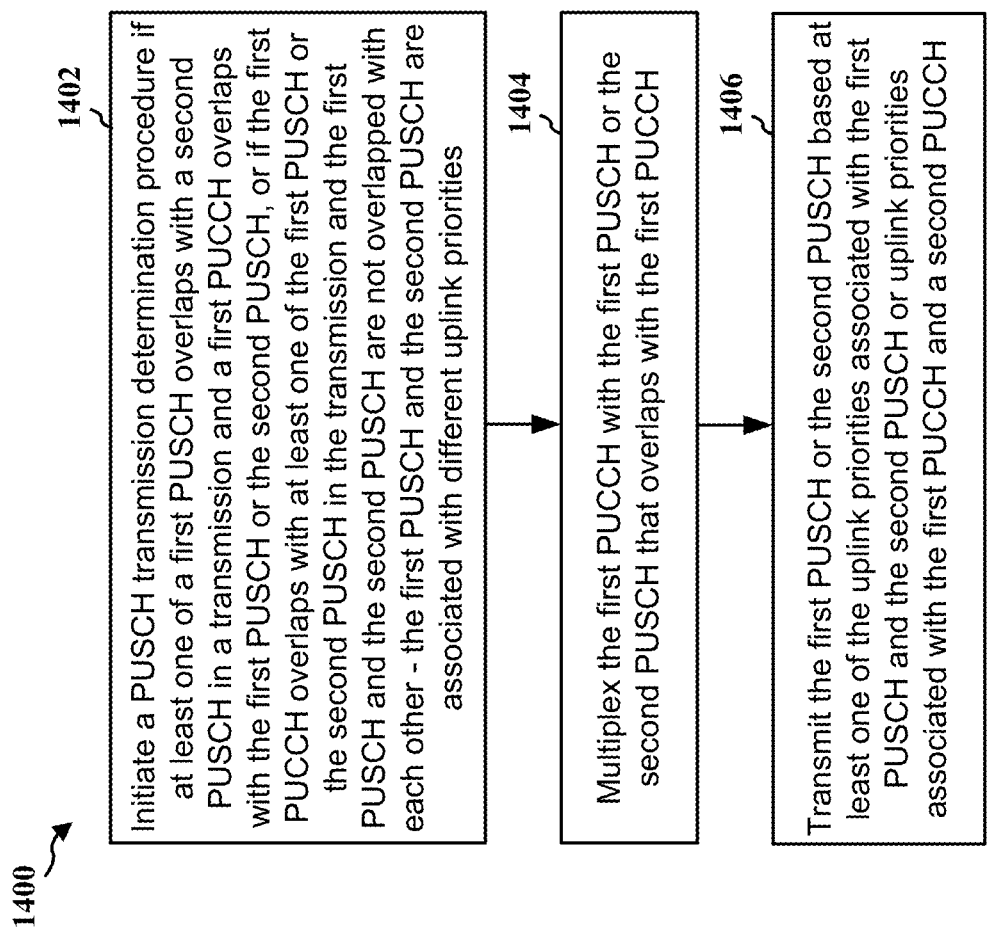
FIG. 14 is a flowchart of a method of wireless communication in accordance with aspects presented herein.

FIG. 14 is a flowchart 1400 of a method of wireless communication. The method may be performed by a UE or a component of a UE (e.g., the UE 104, 350, 402, 502, 602; the apparatus 1502; a processing system, which may include the memory 360 and which may be the entire UE 350 or a component of the UE 350, such as the TX processor 368, the RX processor 356, and/or the controller/processor 359). The method may enable the UE to determine whether to skip one or more overlapping transmissions that may involve PUCCH/UCI multiplexing based at least in part on uplink priorities associated with the overlapping transmissions.

At 1402, the UE may initiate a PUSCH transmission determination procedure when at least one of a first PUSCH overlaps with a second PUSCH in a transmission and a first PUCCH overlaps with the first PUSCH or the second PUSCH, or when the first PUCCH overlaps with at least one of the first PUSCH or the second PUSCH in the transmission and the first PUSCH and the second PUSCH are not overlapped with each other, the first PUSCH and the second PUSCH being associated with different uplink priorities, such as described in connection with FIGS. 4 and 6. For example, at 410, for a group of overlapping channels (e.g., an overlapping PUSCHs) and the PUCCHs that overlap with any of them, the UE 402 may initiate a PUSCH selection (e.g., determination/skipping) procedure. The initiation of the PUSCH transmission determination procedure may be performed, e.g., by the uplink skipping process component 1540 of the apparatus 1502 in FIG. 15.

In one example, the uplink priorities associated with the first PUSCH and the second PUSCH may be based on whether the first PUSCH or the second PUSCH is a DG-PUSCH or a CG-PUSCH.

At 1404, the UE may multiplex the first PUCCH with the first PUSCH or the second PUSCH that overlaps with the first PUCCH, such as described in connection with FIGS. 4 and 6. For example, at 414, the UE 402 may multiplex PUCCH to overlapping PUSCH. The multiplexing may be performed, e.g., by the multiplexer component 1542 of the apparatus 1502 in FIG. 15.

At 1406, the UE may transmit the first PUSCH or the second PUSCH based at least one of the uplink priorities associated with the first PUSCH and the second PUSCH or uplink priorities associated with the first PUCCH and a second PUCCH, such as described in connection with FIGS. 4 and 6. For example, at 426, the UE 402 may select a PUSCH 430 that may not be skipped, and may be used for transmission based at least in part on uplink priorities associated with one or more PUSCHs and/or one or more PUSCHs. Then, at 434, the UE 402 may transmit the selected PUSCH 430 to the base station 404. The transmission of the first PUSCH or the second PUSCH may be performed, e.g., by the PUSCH selection component 1544 and/or the transmission component 1534 of the apparatus 1502 in FIG. 15.

In one example, the UE may determine whether to transmit the first PUSCH or the second PUSCH at a PHY layer of the UE, and the PHY layer may also indicate the determination to transmit the first PUSCH or the second PUSCH to a MAC layer of the UE. In such an example, the MAC layer may generate PDUs for a PUSCH indicated by the PHY layer and skips generating PDUs for a PUSCH not indicated by the PHY layer.

In another example, as described in connection with FIG. 4, the second PUSCH may be configured with a high uplink priority and the first PUSCH may be configured with a low uplink priority, the first PUCCH may be multiplexed with the first PUSCH, and the second PUCCH may be multiplexed with the second PUSCH. In such an example, the UE may transmit the second PUSCH and skips a transmission of the first PUSCH. In such an example, the UE may also skip a transmission of the first PUCCH, or the UE may transmit the first PUCCH if the first PUCCH does not overlap with one or more uplink transmissions with a high uplink priority.

In some examples, as described in connection with FIGS. 5 and 6, the UE may have a capability to multiplex a PUCCH with at least one of another PUCCH or a PUSCH having a different uplink priority. In such examples, the first PUCCH may be multiplexed with the first PUSCH or the second PUSCH that has a different uplink priority from the first PUCCH.

In one example, the determining whether to transmit the first PUSCH or the second PUSCH may be based on the uplink priorities associated with the first PUSCH and the second PUSCH. In such an example, if the first PUCCH is multiplexed with the second PUSCH and the second PUSCH has a lower uplink priority than the first PUCCH, the UE may transmit the second PUSCH and skips a transmission of the first PUSCH. The UE may also transmit the first PUCCH, or skips a transmission for the first PUCCH (e.g., skips the first PUCCH).

In another example, the determining whether to transmit the first PUSCH or the second PUSCH may be based on uplink priorities associated with the first PUCCH and the second PUCCH. In such an example, the UE may apply a rule indicating that a PUSCH configured with a low priority and multiplexed with a PUCCH configured with a high uplink priority is to be selected over a PUSCH configured with a high uplink priority and not multiplexed with a PUCCH. As an alternatively, in another example, the UE may apply a rule indicating that a PUSCH configured with a high uplink priority and not multiplexed with a PUCCH is to be selected over a PUSCH configured with a low priority and is multiplexed with a PUCCH configured with a high uplink priority. The rule may be indicated to the UE by a base station via at least one of an RRC message, a MAC-CE, or DCI, such as described in connection with 636 of FIG. 6.

In another example, as described in connection with FIGS. 5 and 6, the first PUCCH may be multiplexed with the first PUSCH, the first PUCCH and the first PUSCH being having a same uplink priority, and the determining whether to transmit the first PUSCH or the second PUSCH may be based on the uplink priorities associated with the first PUSCH and the second PUSCH. For example, when the second PUSCH has an uplink priority higher than the first PUSCH, the UE may transmit the second PUSCH and skips a transmission of the first PUSCH. In such an example, the UE may transmit at least one of the first PUCCH or the second PUCCH to a base station.

Figure 15:
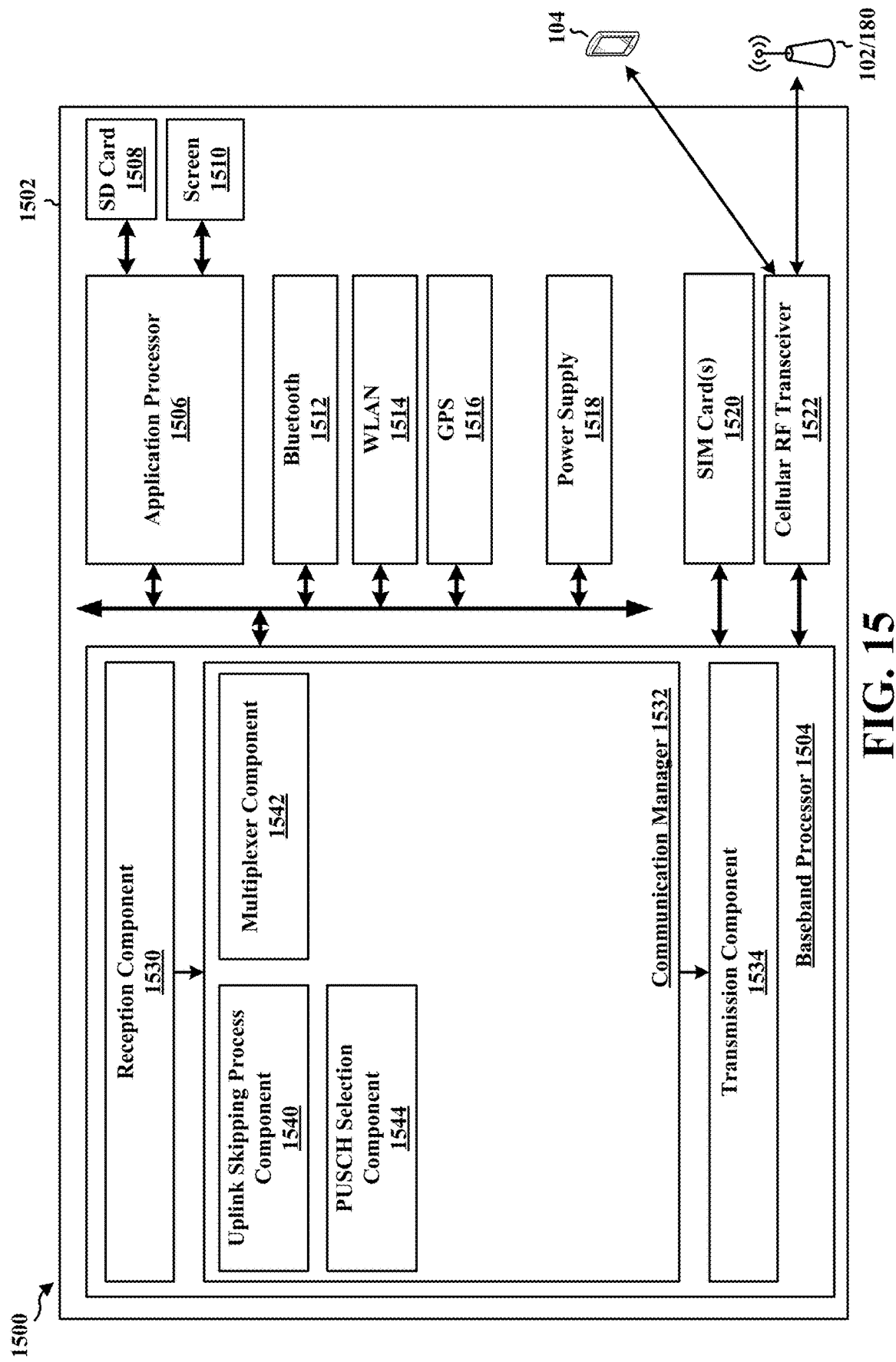
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 is a UE and includes a baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The baseband processor 1504 communicates through the cellular RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described supra. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes uplink skipping process component 1540 that is configured to initiate a PUSCH transmission determination procedure if at least one of a first PUSCH overlaps with a second PUSCH in a transmission and a first PUCCH overlaps with the first PUSCH or the second PUSCH, or if the first PUCCH overlaps with at least one of the first PUSCH or the second PUSCH in the transmission and the first PUSCH and the second PUSCH are not overlapped with each other, the first PUSCH and the second PUSCH being associated with different uplink priorities, e.g., as described in connection with 1402 of FIG. 14. The communication manager 1532 further includes a multiplexer component 1542 that is configured to multiplex the first PUCCH with the first PUSCH or the second PUSCH that overlaps with the first PUCCH, e.g., as described in connection with 1404 of FIG. 14. The communication manager 1532 further includes a PUSCH selection component 1544 that is configured to transmit the first PUSCH or the second PUSCH based at least one of the uplink priorities associated with the first PUSCH and the second PUSCH or uplink priorities associated with the first PUCCH and a second PUCCH, e.g., as described in connection with 1406 of FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband processor 1504, includes means for initiating a PUSCH transmission determination procedure when at least one of a first PUSCH overlaps with a second PUSCH in a transmission and a first PUCCH overlaps with the first PUSCH or the second PUSCH, the first PUSCH and the second PUSCH being associated with different uplink priorities (e.g., the uplink skipping process component 1540). The apparatus 1502 includes means for multiplexing the first PUCCH with the first PUSCH or the second PUSCH that overlaps with the first PUCCH (e.g., the multiplexer component 1542). The apparatus 1502 includes means for transmitting the first PUSCH or the second PUSCH based at least one of the uplink priorities associated with the first PUSCH and the second PUSCH or uplink priorities associated with the first PUCCH and a second PUCCH (e.g., the PUSCH selection component 1544 and/or the transmission component 1534).

In one configuration, the uplink priorities associated with the first PUSCH and the second PUSCH may be based on whether the first PUSCH or the second PUSCH is a DG-PUSCH or a CG-PUSCH.

In one configuration, the apparatus 1502 includes means for determining whether to transmit the first PUSCH or the second PUSCH at a PHY layer of the UE, and the PHY layer may also indicate the determination to transmit the first PUSCH or the second PUSCH to a MAC layer of the UE. In such configuration, the MAC layer may generate PDUs for a PUSCH indicated by the PHY layer and skips generating PDUs for a PUSCH not indicated by the PHY layer.

In one configuration, the second PUSCH may be configured with a high uplink priority and the first PUSCH may be configured with a low uplink priority, the first PUCCH may be multiplexed with the first PUSCH, and the second PUCCH may be multiplexed with the second PUSCH. In such configuration, the UE may transmit the second PUSCH and skips a transmission of the first PUSCH. In such configuration, the UE may also skip a transmission of the first PUCCH, or the UE may transmit the first PUCCH if the first PUCCH does not overlap with one or more uplink transmissions with a high uplink priority.

In some configurations, the UE may have a capability to multiplex a PUCCH with at least one of another PUCCH or a PUSCH having a different uplink priority. In such configurations, the first PUCCH may be multiplexed with the first PUSCH or the second PUSCH that has a different uplink priority from the first PUCCH.

In one configuration, the first PUSCH or the second PUSCH may be transmitted based on the uplink priorities associated with the first PUSCH and the second PUSCH. In such configuration, when the first PUCCH is multiplexed with the second PUSCH and the second PUSCH has a lower uplink priority than the first PUCCH, the UE may transmit the second PUSCH and skips a transmission of the first PUSCH. In such configuration, the UE may also transmit the first PUCCH, or skips a transmission for the first PUCCH.

In another configuration, the first PUSCH or the second PUSCH may be transmitted based on uplink priorities associated with the first PUCCH and the second PUCCH. In such configuration, the apparatus 1502 includes means for applying a rule indicating that a PUSCH configured with a low priority and multiplexed with a PUCCH configured with a high uplink priority is to be selected over a PUSCH configured with a high uplink priority and not multiplexed with a PUCCH. As an alternatively, in another configuration, the apparatus 1502 includes means for applying a rule indicating that a PUSCH configured with a high uplink priority and not multiplexed with a PUCCH is to be selected over a PUSCH configured with a low priority and is multiplexed with a PUCCH configured with a high uplink priority. In such configuration, the rule may be indicated to the UE by a base station via at least one of an RRC message, a MAC-CE, or DCI.

In another configuration, the first PUCCH may be multiplexed with the first PUSCH, the first PUCCH and the first PUSCH being having a same uplink priority, and the first PUSCH or the second PUSCH may be transmitted based on the uplink priorities associated with the first PUSCH and the second PUSCH. In such configuration, when the second PUSCH has an uplink priority higher than the first PUSCH, the apparatus 1502 includes means for transmitting the second PUSCH and means for skipping a transmission of the first PUSCH. In such configuration, the apparatus 1502 includes means for transmitting at least one of the first PUCCH or the second PUCCH to a base station.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
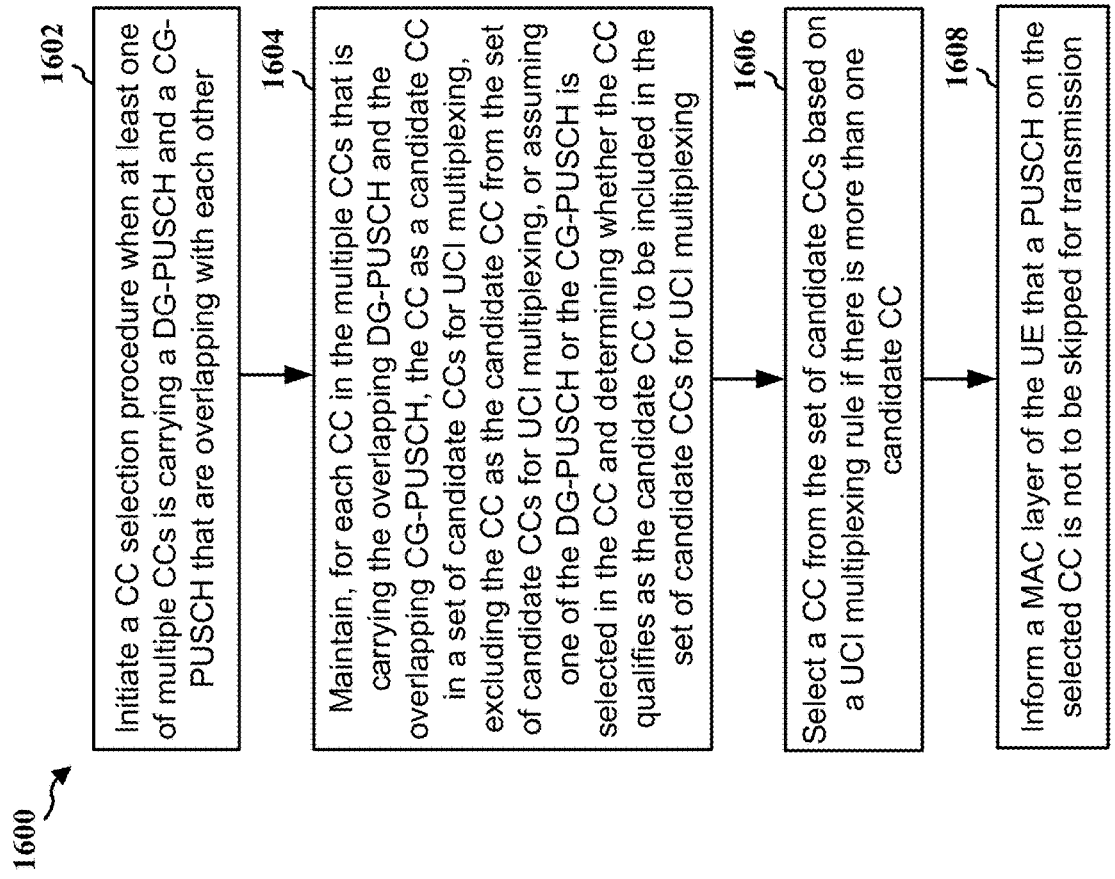
FIG. 16 is a flowchart of a method of wireless communication in accordance with aspects presented herein.

FIG. 16 is a flowchart 1600 of a method of wireless communication. The method may be performed by a UE or a component of a UE (e.g., the UE 104, 350, 802; the apparatus 1702; a processing system, which may include the memory 360 and which may be the entire UE 350 or a component of the UE 350, such as the TX processor 368, the RX processor 356, and/or the controller/processor 359). The method may enable the UE to determine whether to skip one or more overlapping transmissions that may involve PUCCH/UCI multiplexing based at least in part on CC associated with the overlapping transmissions.

At 1602, the UE may initiate a CC selection procedure when at least one of multiple CCs is carrying a DG-PUSCH and a CG-PUSCH that are overlapping with each other, such as described in connection with FIGS. 7 to 9. For example, at 812, if the UE 802 identifies that at least two PUSCH(s) in a CC are overlapped at least partially with each other and may not be transmitted together, and at least one PUCCH may be overlapped with at least one of the PUSCH(s), the UE 802 may be configured to first assume the uplink skipping is not configured for the CC with overlapping PUSCHs, and the UE 802 may initiate a CC selection procedure to identify a CC on which a PUCCH may be multiplexed with. The initiation of the CC selection procedure may be performed, e.g., by the CC selection component 1740 of the apparatus 1702 in FIG. 17.

Figure 9:
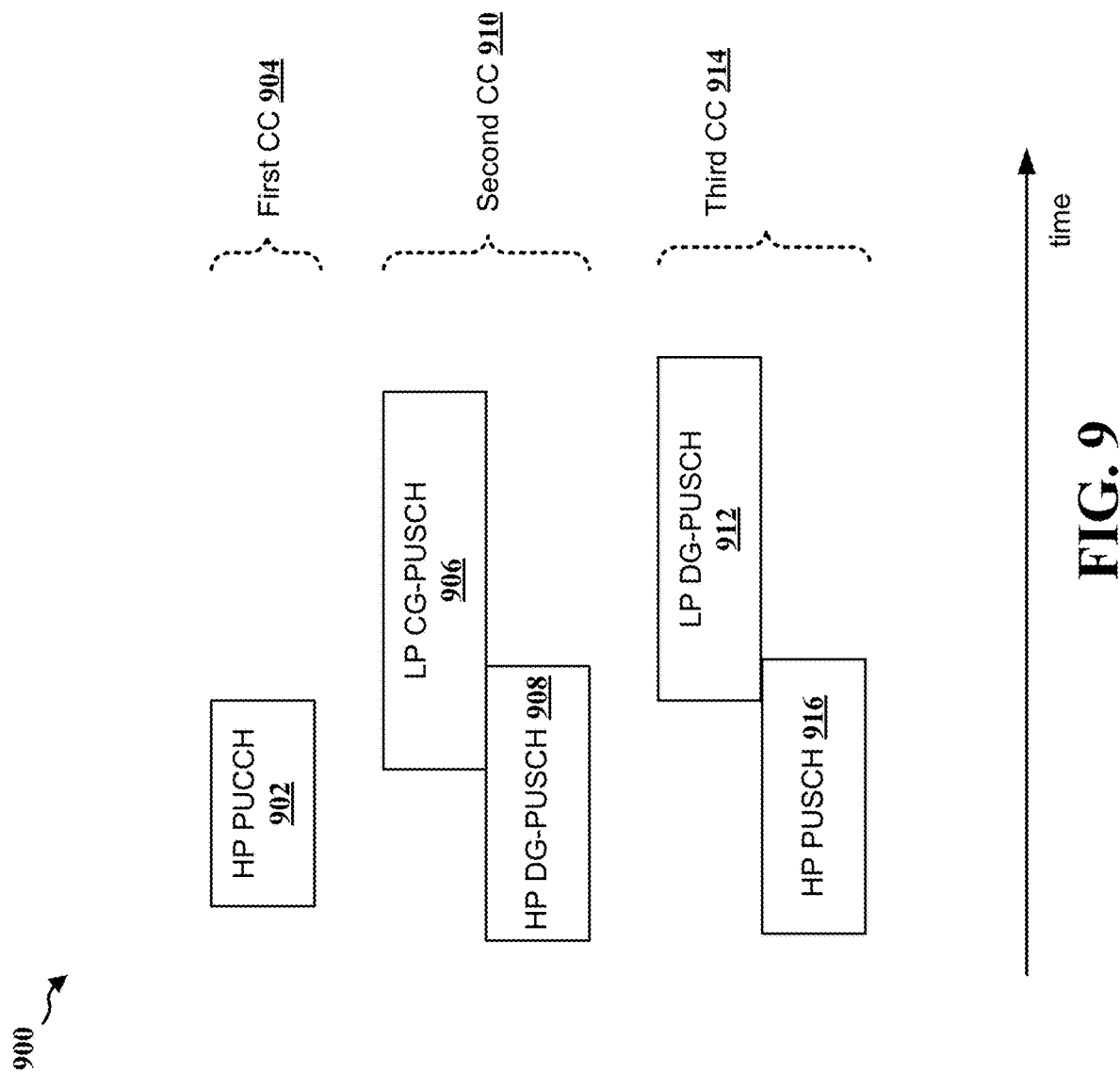
FIG. 9 is a diagram illustrating an example of CCs that include physical uplink shared channels (PUSCHs) associated with physical layer (PHY) priorities overlapping with each other in a CC or with one or more PUSCHs in another CC.

At 1604, the UE may maintain, for each CC in the multiple CCs that is carrying the overlapping DG-PUSCH and the overlapping CG-PUSCH, the CC as a candidate CC in a set of candidate CCs for UCI multiplexing, excluding the CC as the candidate CC from the set of candidate CCs for UCI multiplexing, or assuming one of the DG-PUSCH or the CG-PUSCH is selected in the CC and determining whether the CC qualifies as the candidate CC to be included in the set of candidate CCs for UCI multiplexing, such as described in connection with FIGS. 7 to 9. For example, at 814, if an outcome of a PUSCHs overlap involving at least one DG-PUSCH and at least one CG-PUSCH is ambiguous on a CC, the UE 802 may be configured to keep the CC for UCI multiplexing. The maintaining of the CC candidate(s) may be performed, e.g., by the CC candidate process component 1742 of the apparatus 1702 in FIG. 17.

At 1606, the UE may select a CC from the set of candidate CCs based on a UCI multiplexing rule if there is more than one candidate CC, such as described in connection with FIGS. 7 to 9. For example, at 814, 816, and/or 818, the UE 802 may select a CC from the set of candidate CCs based on a UCI multiplexing rule if there is more than one candidate CC. The selection of the CC may be performed, e.g., by the CC determination component 1744 of the apparatus 1702 in FIG. 17.

At 1608, the UE may inform a MAC layer of the UE that a PUSCH on the selected CC is not to be skipped for transmission, such as described in connection with FIGS. 7 to 9. For example, at 826, the PHY layer of the UE 802 may inform the MAC layer of the UE that the DG-PUSCH 712 on the third CC 714 may not be skipped. The informing of the PUSCH on the selected CC is not to be skipped for transmission may be performed, e.g., by the selection notification component 1746 and/or transmission component 1734 of the apparatus 1702 in FIG. 17.

Figure 17:
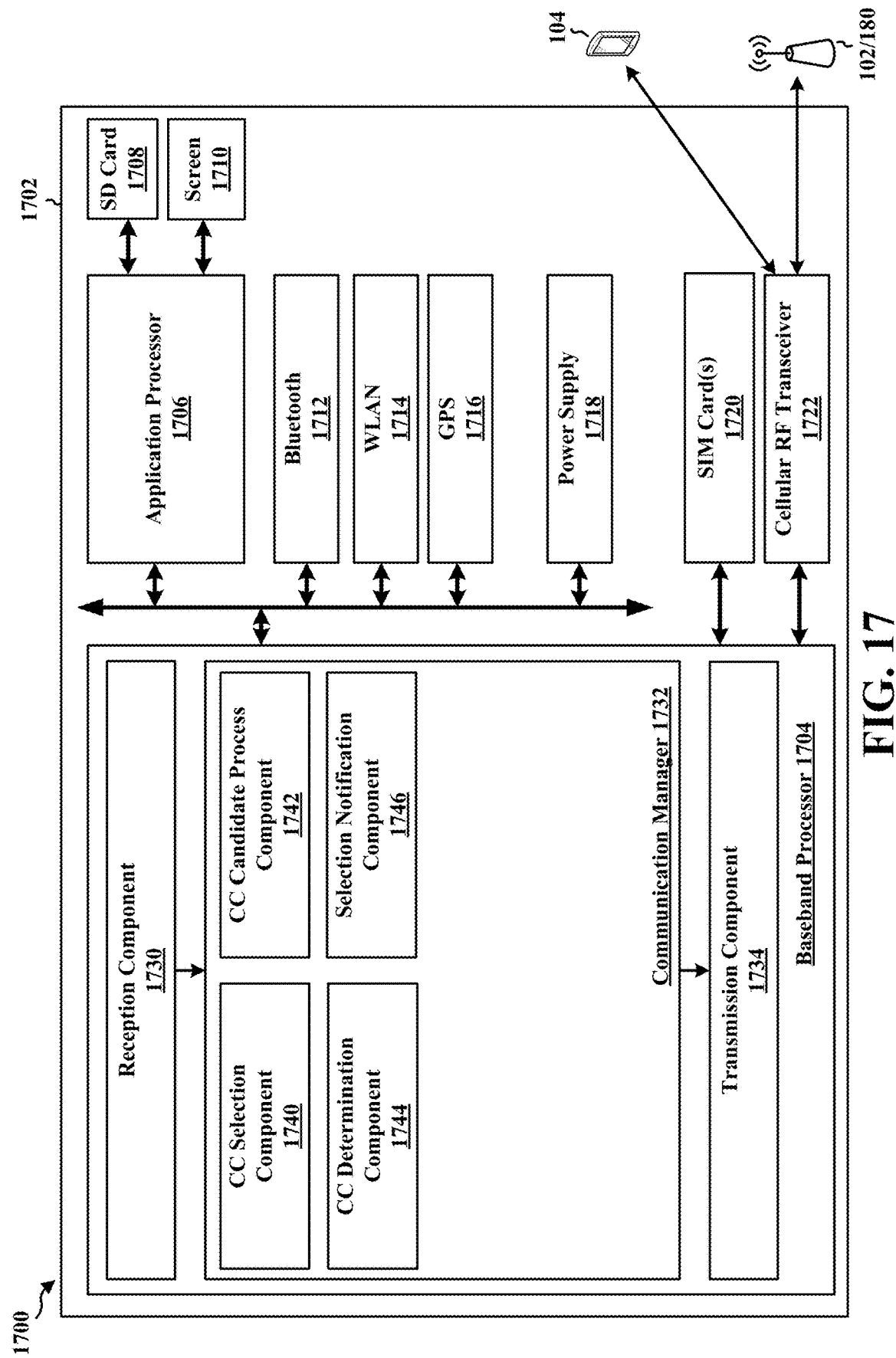
FIG. 17 is a diagram illustrating an example of a hardware implementation for an example apparatus in accordance with aspects presented herein.

FIG. 17 is a diagram 1700 illustrating an example of a hardware implementation for an apparatus 1702. The apparatus 1702 is a UE and includes a baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The baseband processor 1704 communicates through the cellular RF transceiver 1722 with the UE 104 and/or BS 102/180. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described supra. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes CC selection component 1740 that is configured to initiate a CC selection procedure when at least one of multiple CCs is carrying a DG-PUSCH and a CG-PUSCH that are overlapping with each other, e.g., as described in connection with 1602 of FIG. 16. The communication manager 1732 further includes a CC candidate process component 1742 that is configured to maintain, for each CC in the multiple CCs that is carrying the overlapping DG-PUSCH and the overlapping CG-PUSCH, the CC as a candidate CC in a set of candidate CCs for UCI multiplexing, excluding the CC as the candidate CC from the set of candidate CCs for UCI multiplexing, or assuming one of the DG-PUSCH or the CG-PUSCH is selected in the CC and determining whether the CC qualifies as the candidate CC to be included in the set of candidate CCs for UCI multiplexing, e.g., as described in connection with 1604 of FIG. 16. The communication manager 1732 further includes a CC determination component 1744 that is configured to select a CC from the set of candidate CCs based on a UCI multiplexing rule if there is more than one candidate CC, e.g., as described in connection with 1606 of FIG. 16. The communication manager 1732 further includes a selection notification component 1746 that is configured to inform a MAC layer of the UE that a PUSCH on the selected CC is not to be skipped for transmission, e.g., as described in connection with 1608 of FIG. 16.

The apparatus may include additional components that perform each of the blocks of the algorithm in the flowchart of FIG. 16. As such, each block in the flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband processor 1704, includes means for initiating a CC selection procedure when at least one of multiple CCs is carrying a DG-PUSCH and a CG-PUSCH that are overlapping with each other (e.g., the CC selection component 1740). The apparatus 1702 includes means for maintaining, for each CC in the multiple CCs that is carrying the overlapping DG-PUSCH and the overlapping CG-PUSCH, the CC as a candidate CC in a set of candidate CCs for UCI multiplexing, excluding the CC as the candidate CC from the set of candidate CCs for UCI multiplexing, or assuming one of the DG-PUSCH or the CG-PUSCH is selected in the CC and determining whether the CC qualifies as the candidate CC to be included in the set of candidate CCs for UCI multiplexing (e.g., the CC candidate process component 1742). The apparatus 1702 includes means for selecting a CC from the set of candidate CCs based on a UCI multiplexing rule if there is more than one candidate CC (e.g., the CC determination component 1744). The apparatus 1702 includes means for informing a MAC layer of the UE that a PUSCH on the selected CC is not to be skipped for transmission (e.g., the selection notification component 1746 and/or the transmission component 1734).

The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

The following examples set forth additional aspects and are illustrative only and aspects thereof may be combined with aspects of other embodiments or teaching described herein, without limitation.

Aspect 1 is a method of wireless communication of a UE, including: initiating a PUSCH transmission determination procedure when at least one of a first PUSCH overlaps with a second PUSCH in a transmission and a first PUCCH overlaps with the first PUSCH or the second PUSCH, the first PUSCH and the second PUSCH being associated with different uplink priorities; multiplexing the first PUCCH with the first PUSCH or the second PUSCH that overlaps with the first PUCCH; determining whether to transmit the first PUSCH or the second PUSCH based on at least one of the uplink priorities associated with the first PUSCH and the second PUSCH or uplink priorities associated with the first PUCCH and a second PUCCH; and transmitting the first PUSCH or the second PUSCH based on the determination.

In aspect 2, the method of aspect 1 further includes that the uplink priorities associated with the first PUSCH and the second PUSCH are based on whether the first PUSCH or the second PUSCH is a DG-PUSCH or a CG-PUSCH.

In aspect 3, the method of aspect 1 or aspect 2 further includes that the determination whether to transmit the first PUSCH or the second PUSCH is performed at a PHY layer of the UE.

In aspect 4, the method of any of aspects 1-3 further includes that the PHY layer indicates the determination to transmit the first PUSCH or the second PUSCH to a MAC layer of the UE.

In aspect 5, the method of any of aspects 1-4 further includes that the MAC layer generates protocol data units (PDUs) for a PUSCH indicated by the PHY layer and skips generating PDUs for a PUSCH not indicated by the PHY layer.

In aspect 6, the method of any of aspects 1-5 further includes: assuming there is no uplink skipping for the first PUSCH and the second PUSCH.

In aspect 7, the method of any of aspects 1-6 further includes that the second PUSCH is configured with a high uplink priority and the first PUSCH is configured with a low uplink priority, the first PUCCH is multiplexed with the first PUSCH, and the second PUCCH is multiplexed with the second PUSCH.

In aspect 8, the method of any of aspects 1-7 further includes that the UE transmits the second PUSCH and skips a transmission of the first PUSCH.

In aspect 9, the method of any of aspects 1-8 further includes that the UE skips a transmission of the first PUCCH.

In aspect 10, the method of any of aspects 1-9 further includes that the UE transmits the first PUCCH if the first PUCCH does not overlap with one or more uplink transmissions with a high uplink priority.

In aspect 11, the method of any of aspects 1-10 further includes that the UE has a capability to multiplex a PUCCH with at least one of another PUCCH or a PUSCH having a different uplink priority.

In aspect 12, the method of any of aspects 1-11 further includes that the first PUCCH is multiplexed with the first PUSCH or the second PUSCH that has a different uplink priority from the first PUCCH.

In aspect 13, the method of any of aspects 1-12 further includes that the determining whether to transmit the first PUSCH or the second PUSCH is based on the uplink priorities associated with the first PUSCH and the second PUSCH.

In aspect 14, the method of any of aspects 1-13 further includes that the first PUCCH is multiplexed with the second PUSCH and the second PUSCH has a lower uplink priority than the first PUCCH, the UE transmits the second PUSCH and skips a transmission of the first PUSCH.

In aspect 15, the method of any of aspects 1-14 further includes that the UE transmits the first PUCCH.

In aspect 16, the method of any of aspects 1-15 further includes that the UE skips the first PUCCH.

In aspect 17, the method of any of aspects 1-16 further includes that the second PUCCH is multiplexed with the second PUSCH and has a same uplink priority as the second PUSCH, the UE skips the first PUCCH or the second PUCCH or both the first PUCCH and the second PUCCH.

In aspect 18, the method of any of aspects 1-17 further includes that the determining whether to transmit the first PUSCH or the second PUSCH is based on uplink priorities associated with the first PUCCH and the second PUCCH.

In aspect 19, the method of any of aspects 1-18 further includes that the UE applies a rule indicating that a PUSCH configured with a low priority and multiplexed with a PUCCH configured with a high uplink priority is to be selected over a PUSCH configured with a high uplink priority and not multiplexed with a PUCCH.

In aspect 20, the method of any of aspects 1-19 further includes that the rule is indicated to the UE by a base station via at least one of an RRC message, a MAC-CE, or DCI.

In aspect 21, the method of any of aspects 1-20 further includes that the UE applies a rule indicating that a PUSCH configured with a high uplink priority and not multiplexed with a PUCCH is to be selected over a PUSCH configured with a low priority and is multiplexed with a PUCCH configured with a high uplink priority.

In aspect 22, the method of any of aspects 1-21 further includes that the rule is indicated to the UE by a base station via at least one of an RRC message, a MAC-CE, or DCI.

In aspect 23, the method of any of aspects 1-22 further includes that the first PUCCH is multiplexed with the first PUSCH, the first PUCCH and the first PUSCH being having a same uplink priority.

In aspect 24, the method of any of aspects 1-23 further includes that the determining whether to transmit the first PUSCH or the second PUSCH is based on the uplink priorities associated with the first PUSCH and the second PUSCH.

In aspect 25, the method of any of aspects 1-24 further includes that the second PUSCH has an uplink priority higher than the first PUSCH, and the UE transmits the second PUSCH and skips a transmission of the first PUSCH.

In aspect 26, the method of any of aspects 1-25 further includes transmitting at least one of the first PUCCH or the second PUCCH to a base station.

Aspect 27 is an apparatus for wireless communication including at least one processor coupled to a memory and configured to implement a method as in any of aspects 1 to 26.

Aspect 28 is an apparatus for wireless communication including means for implementing a method as in any of aspects 1 to 26.

Aspect 29 is a non-transitory computer-readable medium storing computer executable code, where the code when executed by a processor causes the processor to implement a method as in any of aspects 1 to 26.

Aspect 30 is a method of wireless communication of a base station, including: transmitting, to a UE, an indication of which PUSCH is to be selected by the UE when the UE is scheduled with at least two PUSCHs with different uplink priorities that are at least partially overlapped and at least one of the at least two PUSCHs is multiplexed with a PUCCH; and receiving, from the UE, one of the at least two PUSCHs.

In aspect 31, the method of aspect 30 further includes that the at least two PUSCHs include at least a first PUSCH configured with a low uplink priority and a second PUSCH configured with a high uplink priority, and the PUCCH is configured with a high uplink priority and overlaps with the first PUSCH.

In aspect 32, the method of aspect 30 or aspect 31 further includes that the UE applies a rule that indicates a PUSCH configured with low uplink priority and multiplexed with a PUCCH configured with a high uplink priority is to be selected over a PUSCH configured with a high uplink priority and not multiplexed with a PUCCH, where the base station receives the first PUSCH from the UE.

In aspect 33, the method of any of aspects 30-32 further includes that the base station indicates the rule to the UE via at least one of an RRC message, a MAC-CE, or DCI.

In aspect 34, the method of any of aspects 30-33 further includes that the UE applies a rule that indicates a PUSCH configured with a high uplink priority and not multiplexed with a PUCCH is to be selected over a PUSCH configured with low uplink priority and multiplexed with a PUCCH configured with a high uplink priority, where the base station receives the second PUSCH from the UE.

In aspect 35, the method of any of aspects 30-34 further includes that the base station indicates the rule to the UE via at least one of an RRC message, a MAC-CE, or DCI.

Aspect 36 is an apparatus for wireless communication including at least one processor coupled to a memory and configured to implement a method as in any of aspects 30 to 35.

Aspect 37 is an apparatus for wireless communication including means for implementing a method as in any of aspects 30 to 35.

Aspect 38 is a non-transitory computer-readable medium storing computer executable code, where the code when executed by a processor causes the processor to implement a method as in any of aspects 30 to 35.

Aspect 39 is an apparatus for wireless communication including at least one processor coupled to a memory and configured to initiate a PUSCH transmission determination procedure if at least one of a first PUSCH overlaps with a second PUSCH in a transmission and a first PUCCH overlaps with the first PUSCH or the second PUSCH, or if the first PUCCH overlaps with at least one of the first PUSCH or the second PUSCH in the transmission and the first PUSCH and the second PUSCH are not overlapped with each other, the first PUSCH and the second PUSCH being associated with different uplink priorities; multiplex the first PUCCH with the first PUSCH or the second PUSCH that overlaps with the first PUCCH; and transmit the first PUSCH or the second PUSCH based on at least one of the uplink priorities associated with the first PUSCH and the second PUSCH or uplink priorities associated with the first PUCCH and a second PUCCH.

Aspect 40 is the apparatus of aspect 39, where the uplink priorities associated with the first PUSCH and the second PUSCH are based on whether the first PUSCH or the second PUSCH is a DG-PUSCH or a CG-PUSCH.

Aspect 41 is the apparatus of any of aspects 39 and 40, where the at least one processor and the memory are further configured to determine whether to transmit the first PUSCH or the second PUSCH at a PHY layer of the UE.

Aspect 42 is the apparatus of any of aspects 39 to 41, where the PHY layer indicates the determination to transmit the first PUSCH or the second PUSCH to a MAC layer of the UE.

Aspect 43 is the apparatus of any of aspects 39 to 42, where the MAC layer generates PDUs for a PUSCH indicated by the PHY layer and skips generating PDUs for a PUSCH not indicated by the PHY layer.

Aspect 44 is the apparatus of any of aspects 39 to 43, where the at least one processor and the memory are further configured to: assume there is no uplink skipping for the first PUSCH and the second PUSCH.

Aspect 45 is the apparatus of any of aspects 39 to 44, where the second PUSCH is configured with a high uplink priority and the first PUSCH is configured with a low uplink priority, the first PUCCH is multiplexed with the first PUSCH, and the second PUCCH is multiplexed with the second PUSCH.

Aspect 46 is the apparatus of any of aspects 39 to 45, where the at least one processor and the memory are further configured to transmit the second PUSCH and skip a transmission of the first PUSCH.

Aspect 47 is the apparatus of any of aspects 39 to 46, where the at least one processor and the memory are further configured to skip a transmission of the first PUCCH.

Aspect 48 is the apparatus of any of aspects 39 to 47, where the at least one processor and the memory are further configured to transmit the first PUCCH if the first PUCCH does not overlap with one or more uplink transmissions with a high uplink priority.

Aspect 49 is the apparatus of any of aspects 39 to 48, where the UE has a capability to multiplex a PUCCH with at least one of another PUCCH or a PUSCH having a different uplink priority.

Aspect 50 is the apparatus of any of aspects 39 to 49, where the first PUCCH is multiplexed with the first PUSCH or the second PUSCH that has a different uplink priority from the first PUCCH.

Aspect 51 is the apparatus of any of aspects 39 to 50, where the first PUSCH or the second PUSCH is transmitted based on the uplink priorities associated with the first PUSCH and the second PUSCH.

Aspect 52 is the apparatus of any of aspects 39 to 51, where the first PUCCH is multiplexed with the second PUSCH and the second PUSCH has a lower uplink priority than the first PUCCH, the UE transmits the second PUSCH and skips a transmission of the first PUSCH.

Aspect 53 is the apparatus of any of aspects 39 to 52, where the at least one processor and the memory are further configured to transmit the first PUCCH.

Aspect 54 is the apparatus of any of aspects 39 to 53, where the at least one processor and the memory are further configured to skip the first PUCCH.

Aspect 55 is the apparatus of any of aspects 39 to 54, where the second PUCCH is multiplexed with the second PUSCH and has a same uplink priority as the second PUSCH, the at least one processor and the memory are further configured to skip the first PUCCH or the second PUCCH or both the first PUCCH and the second PUCCH.

Aspect 56 is the apparatus of any of aspects 39 to 55, where the first PUSCH or the second PUSCH is transmitted based on uplink priorities associated with the first PUCCH and the second PUCCH.

Aspect 57 is the apparatus of any of aspects 39 to 56, where the at least one processor and the memory are further configured to apply a rule indicating that a PUSCH configured with a low priority and multiplexed with a PUCCH configured with a high uplink priority is to be selected over a PUSCH configured with a high uplink priority and not multiplexed with a PUCCH.

Aspect 58 is the apparatus of any of aspects 39 to 57, where the rule is indicated to the UE by a base station via at least one of an RRC message, a MAC-CE, or DCI.

Aspect 59 is the apparatus of any of aspects 39 to 58, where the at least one processor and the memory are further configured to apply a rule indicating that a PUSCH configured with a high uplink priority and not multiplexed with a PUCCH is to be selected over a PUSCH configured with a low priority and is multiplexed with a PUCCH configured with a high uplink priority.

Aspect 60 is the apparatus of any of aspects 39 to 59, where the rule is indicated to the UE by a base station via at least one of an RRC message, a MAC-CE, or DCI.

Aspect 61 is the apparatus of any of aspects 39 to 60, where the first PUCCH is multiplexed with the first PUSCH, the first PUCCH and the first PUSCH being having a same uplink priority.

Aspect 62 is the apparatus of any of aspects 39 to 61, where the first PUSCH or the second PUSCH is transmitted based on the uplink priorities associated with the first PUSCH and the second PUSCH.

Aspect 63 is the apparatus of any of aspects 39 to 62, where the second PUSCH has an uplink priority higher than the first PUSCH, and the at least one processor and the memory are further configured to transmit the second PUSCH and skip a transmission of the first PUSCH.

Aspect 64 is the apparatus of any of aspects 39 to 63, where the at least one processor and the memory are further configured to transmit at least one of the first PUCCH or the second PUCCH to a base station.

Aspect 65 is the apparatus of any of aspects 39 to 64, further includes a transceiver coupled to the at least one processor.

Aspect 66 is a method of wireless communication for implementing any of aspects 39 to 65.

Aspect 67 is an apparatus for wireless communication including means for implementing any of aspects 39 to 65.

Aspect 68 is a computer-readable medium storing computer executable code, where the code when executed by a processor causes the processor to implement any of aspects 39 to 65.

Aspect 69 is an apparatus for wireless communication including at least one processor coupled to a memory and configured to: initiate a CC selection procedure when at least one of multiple CCs is carrying a DG-PUSCH and a CG-PUSCH that are overlapping with each other; maintain, for each CC in the multiple CCs that is carrying the overlapping DG-PUSCH and the overlapping CG-PUSCH, the CC as a candidate CC in a set of candidate CCs for UCI multiplexing, excluding the CC as the candidate CC from the set of candidate CCs for UCI multiplexing, or assuming one of the DG-PUSCH or the CG-PUSCH is selected in the CC and determining whether the CC qualifies as the candidate CC to be included in the set of candidate CCs for UCI multiplexing; select a CC from the set of candidate CCs based on a UCI multiplexing rule if there is more than one candidate CC; and inform a MAC layer of the UE that a PUSCH on the selected CC is not to be skipped for transmission.

Aspect 70 is a method of wireless communication including: initiating a CC selection procedure when at least one of multiple CCs is carrying a DG-PUSCH and a CG-PUSCH that are overlapping with each other; maintaining, for each CC in the multiple CCs that is carrying the overlapping DG-PUSCH and the overlapping CG-PUSCH, the CC as a candidate CC in a set of candidate CCs for UCI multiplexing, excluding the CC as the candidate CC from the set of candidate CCs for UCI multiplexing, or assuming one of the DG-PUSCH or the CG-PUSCH is selected in the CC and determining whether the CC qualifies as the candidate CC to be included in the set of candidate CCs for UCI multiplexing; selecting a CC from the set of candidate CCs based on a UCI multiplexing rule if there is more than one candidate CC; and informing a MAC layer of the UE that a PUSCH on the selected CC is not to be skipped for transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
at least one memory; and
at least one processor coupled to the at least one memory and configured to:
assume, at a physical (PHY) layer of the UE, there is no uplink skipping for overlapping channels;
initiate, based on assumption that there is no uplink skipping, a physical uplink shared channel (PUSCH) transmission determination procedure if at least one of (1) a first PUSCH overlaps with a second PUSCH in a transmission and a first physical uplink control channel (PUCCH) overlaps with the first PUSCH or the second PUSCH, or (2) the first PUCCH overlaps both the first PUSCH and the second PUSCH in the transmission and the first PUSCH and the second PUSCH are not overlapped with each other, wherein the first PUSCH and the second PUSCH are associated with different uplink priorities, wherein the PUSCH transmission determination procedure identifies a PUSCH not to be skipped at a medium access control (MAC) layer of the UE;
(1) multiplex the first PUCCH with the first PUSCH if the first PUSCH overlaps with the second PUSCH in the transmission and the first PUCCH overlaps with the first PUSCH, or (2) multiplex the first PUCCH with the second PUSCH that overlaps with the first PUCCH if the first PUCCH overlaps with both the first PUSCH and the second PUSCH in the transmission and the first PUSCH and the second PUSCH are not overlapped with each other; and
select either the first PUSCH or the second PUSCH as the PUSCH not to be skipped at the MAC layer of the UE based on at least one of: (1) the uplink priorities associated with the first PUSCH and the second PUSCH, or (2) a second set of uplink priorities associated with the first PUCCH and a second PUCCH.

2. The apparatus of claim 1, wherein the uplink priorities associated with the first PUSCH and the second PUSCH are based on whether the first PUSCH or the second PUSCH is a dynamic grant (DG)-PUSCH or a configured grant (CG)-PUSCH.

3. The apparatus of claim 1, wherein the at least one processor and the memory are further configured to determine whether to transmit the first PUSCH or the second PUSCH at the PHY layer of the UE.

4. The apparatus of claim 3, wherein the PHY layer indicates the determination to transmit the first PUSCH or the second PUSCH to the MAC layer of the UE.

5. The apparatus of claim 4, wherein the MAC layer generates protocol data units (PDUs) for a PUSCH indicated by the PHY layer and skips generating PDUs for a PUSCH not indicated by the PHY layer.

6. The apparatus of claim 1, wherein to assume there is no uplink skipping for the overlapping channels, the at least one processor and the memory are configured to:
assume there is no uplink skipping for the overlapping channels based on the UE does not support cross-priority multiplexing.

7. The apparatus of claim 1, wherein the second PUSCH is configured with a high uplink priority and the first PUSCH is configured with a low uplink priority, the first PUCCH is multiplexed with the first PUSCH, and the second PUCCH is multiplexed with the second PUSCH.

8. The apparatus of claim 7, wherein the at least one processor and the memory are further configured to transmit the second PUSCH and skip a transmission of the first PUSCH.

9. The apparatus of claim 8, wherein the at least one processor and the memory are further configured to skip a transmission of the first PUCCH.

10. The apparatus of claim 8, wherein the at least one processor and the memory are further configured to transmit the first PUCCH if the first PUCCH does not overlap with one or more uplink transmissions with a high uplink priority.

11. The apparatus of claim 1, wherein the UE has a capability to multiplex a PUCCH with at least one of another PUCCH or a PUSCH having a different uplink priority.

12. The apparatus of claim 11, wherein the first PUCCH is multiplexed with the first PUSCH or the second PUSCH that has a different uplink priority from the first PUCCH.

13. The apparatus of claim 12, wherein to transmit the first PUSCH or the second PUSCH, the at least one processor and the memory are configured to transmit the first PUSCH or the second PUSCH based on the uplink priorities associated with the first PUSCH and the second PUSCH.

14. The apparatus of claim 13, wherein the first PUCCH is multiplexed with the second PUSCH and the second PUSCH has a lower uplink priority than the first PUCCH, the UE transmits the second PUSCH and skips a transmission of the first PUSCH.

15. The apparatus of claim 14, wherein the at least one processor and the memory are further configured to transmit the first PUCCH.

16. The apparatus of claim 14, wherein the at least one processor and the memory are further configured to skip the first PUCCH.

17. The apparatus of claim 14, wherein the second PUCCH is multiplexed with the second PUSCH and has a same uplink priority as the second PUSCH, the at least one processor and the memory are further configured to skip the first PUCCH or the second PUCCH or both the first PUCCH and the second PUCCH.

18. The apparatus of claim 12, wherein to transmit the first PUSCH or the second PUSCH, the at least one processor and the memory are configured to transmit the first PUSCH or the second PUSCH based on uplink priorities associated with the first PUCCH and the second PUCCH.

19. The apparatus of claim 18, wherein the at least one processor and the memory are further configured to apply a rule indicating that a PUSCH configured with a low priority and multiplexed with a PUCCH configured with a high uplink priority is to be selected over a PUSCH configured with a high uplink priority and not multiplexed with a PUCCH.

20. The apparatus of claim 19, wherein the rule is indicated to the UE by a base station via at least one of a radio resource control (RRC) message, a medium access control (MAC)-control element (MAC-CE), or downlink control information (DCI).

21. The apparatus of claim 18, wherein the at least one processor and the memory are further configured to apply a rule indicating that a PUSCH configured with a high uplink priority and not multiplexed with a PUCCH is to be selected over a PUSCH configured with a low priority and is multiplexed with a PUCCH configured with a high uplink priority.

22. The apparatus of claim 21, wherein the rule is indicated to the UE by a base station via at least one of a radio resource control (RRC) message, a medium access control (MAC)-control element (MAC-CE), or downlink control information (DCI).

23. The apparatus of claim 1, wherein the first PUCCH is multiplexed with the first PUSCH, the first PUCCH and the first PUSCH being having a same uplink priority.

24. The apparatus of claim 23, wherein to transmit the first PUSCH or the second PUSCH, the at least one processor and the memory are configured to transmit the first PUSCH or the second PUSCH based on the uplink priorities associated with the first PUSCH and the second PUSCH.

25. The apparatus of claim 24, wherein the second PUSCH has an uplink priority higher than the first PUSCH, and the at least one processor and the memory are further configured to transmit the second PUSCH and skip a transmission of the first PUSCH.

26. The apparatus of claim 25, wherein the at least one processor and the memory are further configured to transmit at least one of the first PUCCH or the second PUCCH to a base station.

27. The apparatus of claim 1, further comprising a transceiver coupled to the at least one processor.

28. A method of wireless communication at a user equipment (UE), comprising:
assuming, at a physical (PHY) layer of the UE, there is no uplink skipping for overlapping channels;
initiating, based on assumption that there is no uplink skipping, a physical uplink shared channel (PUSCH) transmission determination procedure if at least one of (1) a first PUSCH overlaps with a second PUSCH in a transmission and a first physical uplink control channel (PUCCH) overlaps with the first PUSCH or the second PUSCH, or (2) the first PUCCH overlaps both the first PUSCH and the second PUSCH in the transmission and the first PUSCH and the second PUSCH are not overlapped with each other, wherein the first PUSCH and the second PUSCH are associated with different uplink priorities, wherein the PUSCH transmission determination procedure identifies a PUSCH not to be skipped at a medium access control (MAC) layer of the UE;
(1) multiplexing the first PUCCH with the first PUSCH if the first PUSCH overlaps with the second PUSCH in the transmission and the first PUCCH overlaps with the first PUSCH, or (2) multiplex the first PUCCH with the second PUSCH that overlaps with the first PUCCH if the first PUCCH overlaps with both the first PUSCH and the second PUSCH in the transmission and the first PUSCH and the second PUSCH are not overlapped with each other; and select either the first PUSCH or the second PUSCH as the PUSCH not to be skipped at the MAC layer of the UE based on at least one of (1) the uplink priorities associated with the first PUSCH and the second PUSCH or (2) a second set of uplink priorities associated with the first PUCCH and a second PUCCH.

29. An apparatus for wireless communication at a user equipment (UE), comprising:
means for assuming, at a physical (PHY) layer of the UE, there is no uplink skipping for overlapping channels;
means for initiating, based on assumption that there is no uplink skipping, a physical uplink shared channel (PUSCH) transmission determination procedure if at least one of (1) a first PUSCH overlaps with a second PUSCH in a transmission and a first physical uplink control channel (PUCCH) overlaps with the first PUSCH or the second PUSCH, or (2) the first PUCCH overlaps both the first PUSCH and the second PUSCH in the transmission and the first PUSCH and the second PUSCH are not overlapped with each other, wherein the first PUSCH and the second PUSCH are associated with different uplink priorities, wherein the PUSCH transmission determination procedure identifies a PUSCH not to be skipped at a medium access control (MAC) layer of the UE;
(1) means for multiplexing the first PUCCH with the first PUSCH if the first PUSCH overlaps with the second PUSCH in the transmission and the first PUCCH overlaps with the first PUSCH, or (2) means for multiplex the first PUCCH with the second PUSCH that overlaps with the first PUCCH if the first PUCCH overlaps with both the first PUSCH and the second PUSCH in the transmission and the first PUSCH and the second PUSCH are not overlapped with each other; and
select either the first PUSCH or the second PUSCH as the PUSCH not to be skipped at the MAC layer of the UE based on at least one of (1) the uplink priorities associated with the first PUSCH and the second PUSCH or (2) a second set of uplink priorities associated with the first PUCCH and a second PUCCH.

30. A non-transitory computer-readable medium storing computer executable code at a user equipment (UE), the code when executed by at least one processor causes the at least one processor to:
assume, at a physical (PHY) layer of the UE, there is no uplink skipping for overlapping channels;
initiate, based on assumption that there is no uplink skipping, a physical uplink shared channel (PUSCH) transmission determination procedure if at least one of (1) a first PUSCH overlaps with a second PUSCH in a transmission and a first physical uplink control channel (PUCCH) overlaps with the first PUSCH or the second PUSCH, or (2) the first PUCCH overlaps both the first PUSCH and the second PUSCH in the transmission and the first PUSCH and the second PUSCH are not overlapped with each other, wherein the first PUSCH and the second PUSCH are associated with different uplink priorities, wherein the PUSCH transmission determination procedure identifies a PUSCH not to be skipped at a medium access control (MAC) layer of the UE;
(1) multiplex the first PUCCH with the first PUSCH if the first PUSCH overlaps with the second PUSCH in the transmission and the first PUCCH overlaps with the first PUSCH, or (2) multiplex the first PUCCH with the second PUSCH that overlaps with the first PUCCH if the first PUCCH overlaps with both the first PUSCH and the second PUSCH in the transmission and the first PUSCH and the second PUSCH are not overlapped with each other; and select either the first PUSCH or the second PUSCH as the PUSCH not to be skipped at the MAC layer of the UE based on at least one of: (1) the uplink priorities associated with the first PUSCH and the second PUSCH, or (2) a second set of uplink priorities associated with the first PUCCH and a second PUCCH.

* * * * *